United States Patent
Gorokhov et al.

(10) Patent No.: US 8,447,236 B2
(45) Date of Patent: May 21, 2013

(54) SPATIAL INTERFERENCE MITIGATION SCHEMES FOR WIRELESS COMMUNICATION

(75) Inventors: Alexei Y. Gorokhov, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

(21) Appl. No.: 12/463,734

(22) Filed: May 11, 2009

(65) Prior Publication Data

US 2009/0286482 A1    Nov. 19, 2009

Related U.S. Application Data

(60) Provisional application No. 61/053,564, filed on May 15, 2008, provisional application No. 61/117,852, filed on Nov. 25, 2008.

(51) Int. Cl.
*H04B 1/00* (2006.01)

(52) U.S. Cl.
USPC .......................................... 455/63.1; 455/501

(58) Field of Classification Search ........................ None
See application file for complete search history.

(56) References Cited

U.S. PATENT DOCUMENTS

| | | | |
|---|---|---|---|
| 7,139,328 B2 | 11/2006 | Thomas et al. | |
| 8,140,098 B2 * | 3/2012 | Gorokhov | 455/501 |
| 2002/0187812 A1 | 12/2002 | Guo | |
| 2003/0020651 A1 | 1/2003 | Crilly, Jr. et al. | |
| 2006/0093065 A1 | 5/2006 | Thomas et al. | |
| 2007/0147536 A1 | 6/2007 | Melzer et al. | |
| 2008/0013610 A1 | 1/2008 | Varadarajan et al. | |
| 2008/0045153 A1* | 2/2008 | Surineni et al. | 455/63.1 |

FOREIGN PATENT DOCUMENTS

| | | |
|---|---|---|
| EP | 1267443 A2 | 12/2002 |
| EP | 1816883 A1 | 8/2007 |
| JP | 2002152108 A | 5/2002 |
| JP | 2006197639 A | 7/2006 |
| RU | 2259636 | 8/2005 |

(Continued)

OTHER PUBLICATIONS

Cheng Wang et al.: "Investigation into MU-MISO Transmission with Limited Feedback," IEEE Wireless Communications and Networking Conference, Apr. 3, 2006, pp. 2035-2039.

(Continued)

*Primary Examiner* — Cassandra Cox
(74) *Attorney, Agent, or Firm* — Kam T. Tam

(57) ABSTRACT

Techniques for transmitting and receiving data with spatial interference mitigation in a wireless communication network are described. In one design, a cell may receive precoding information from a first user equipment (UE) communicating with the cell and spatial feedback information (SFI) from a second UE not communicating with the cell. The cell may select a precoding matrix based on the precoding information and the SFI. The precoding matrix may steer a transmission toward the first UE and away from the second UE. The cell may send a reference signal based on the precoding matrix, send a resource quality information (RQI) request to the first UE, receive RQI determined by the first UE based on the reference signal, and determine a modulation and coding scheme (MCS) based on the RQI. The cell may then send a data transmission to the first UE with the precoding matrix and in accordance with the MCS.

66 Claims, 10 Drawing Sheets

FOREIGN PATENT DOCUMENTS

| TW | 200642378 | 12/2006 |
|---|---|---|
| TW | I274482 | 2/2007 |
| TW | 200737798 | 10/2007 |
| WO | 2006052501 | 5/2006 |
| WO | WO2007124460 | 11/2007 |
| WO | WO2008052191 | 5/2008 |

OTHER PUBLICATIONS

International Search Report and Written Opinion—PCT/US2009/044204—International Search Authority, European Patent Office, Jun. 29, 2010.

Lal C Godara: "Application of Antenna Arrays to Mobile Communications, Part II: Beam-Forming and Direction-of-Arrival Considerations" Proceedings of the IEEE, vol. 85, No. 8, Aug. 1, 1997, pp. 1195-1245, XP011043875.

Partial International Search Report—PCT/US09/044204, International Searching Authority—European Patent Office, May 6, 2010.

Tamer Elbatt: "Towards Scheduling MIMO Links in Interderence-Limited Wireless Ad Hoc Networks" IEEE Military Communications Conference, Oct. 29, 2007, pp. 1-7, XP031232633 IEEE, Piscataway, NJ, USA ISBN: 978-1-4244-1512-0.

Wang, et al., "Investigations into MU-MISO transmission with limited feedback" IEEE Wireless Communications and Networking Conference, Apr. 3, 2006, pp. 2035-2039, XO031387508, IEEE Piscataway, NJ, USA, ISBN: 978-1-4244-0269-4 abstract; table I sections I, II, III.B.

International Search Report and Written Opinion—PCT/US2009/044208, International Search Authority—European Patent Office—Jul. 9, 2010.

Partial International Search Report—PCT/US2009/044208—International Search Authority—European Patent Office, May 4, 2010.

Taiwan Search Report—TW098116201—TIPO—Oct. 10, 2012.

\* cited by examiner

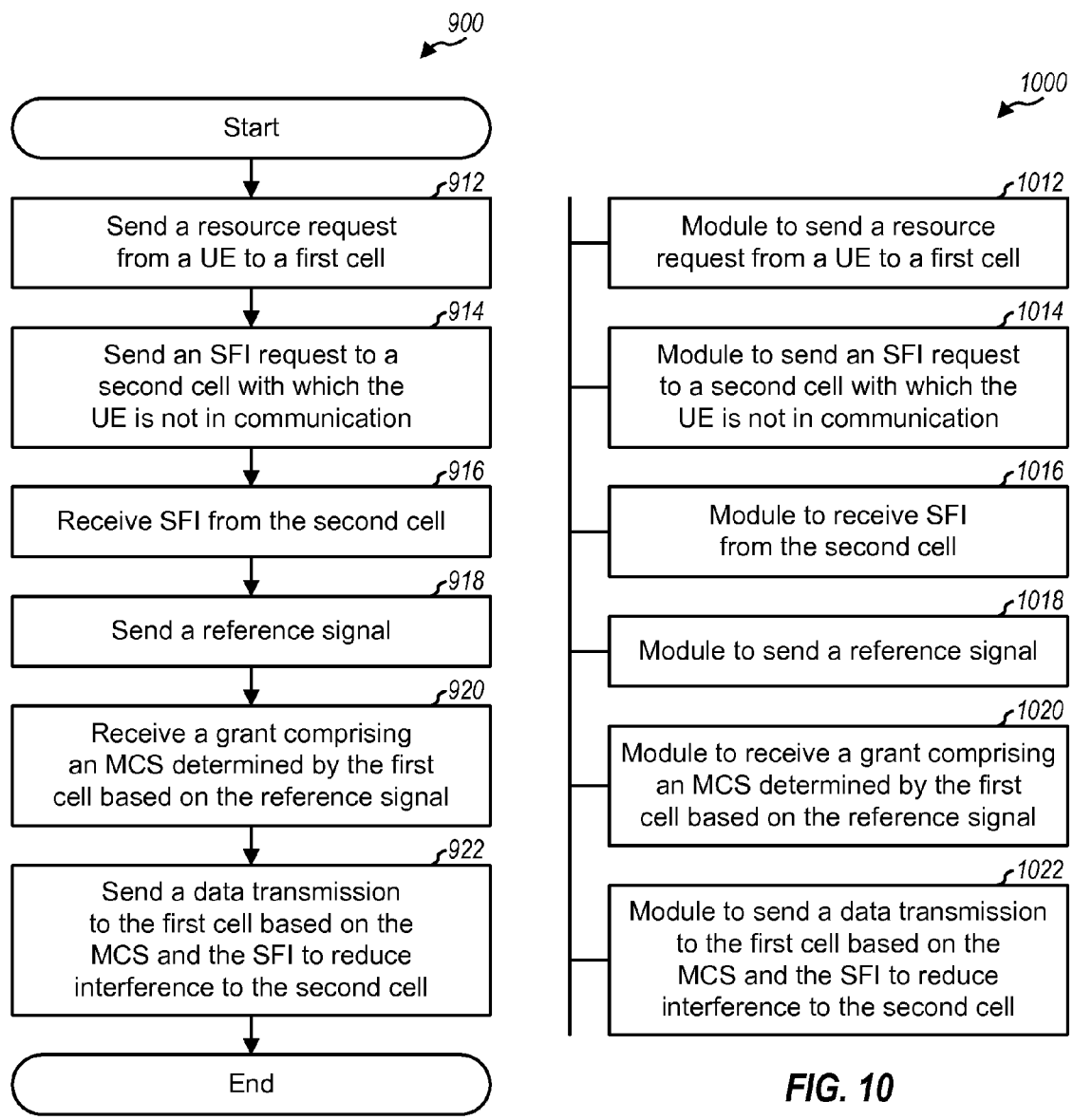

SPATIAL INTERFERENCE MITIGATION SCHEMES FOR WIRELESS COMMUNICATION

The present application claims priority to provisional U.S. Application Ser. No. 61/053,564, entitled "SPATIAL INTERFERENCE AVOIDANCE TECHNIQUES," filed May 15, 2008, and provisional U.S. Application Ser. No. 61/117,852, entitled "SPATIAL INTERFERENCE AVOIDANCE TIMELINE," filed Nov. 25, 2008, both assigned to the assignee hereof and incorporated herein by reference.

BACKGROUND

I. Field

The present disclosure relates generally to communication, and more specifically to techniques for transmitting and receiving data in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may be within the coverage of multiple base stations. One base station may be selected to serve the UE, and the remaining base stations may be non-serving base stations. The UE may observe high interference from a non-serving base station on the downlink and/or may cause high interference to the non-serving base station on the uplink. It may be desirable to transmit data in a manner to achieve good performance even in the presence of strong non-serving base stations.

SUMMARY

Techniques for transmitting and receiving data with spatial interference mitigation in a wireless communication network are described herein. Spatial interference mitigation refers to reduction of interference at an interfered station based on spatial nulling and/or receiver spatial processing. Spatial nulling refers to steering of a transmission in a direction away from the interfered station to reduce interference to the interfered station. Receiver spatial processing refers to detection for multiple receive antennas to recover desired signal components and suppress interference. Spatial interference mitigation may also be referred to as cooperative beamforming (CEB).

In one design of data transmission on the downlink with spatial interference mitigation, a cell may receive precoding information from a first UE and may receive spatial feedback information (SFI) from a second UE not communicating with the cell. The SFI may comprise various types of information used for spatial nulling, as described below. The cell may select a precoding matrix based on the precoding information from the first UE and the SFI from the second UE. The precoding matrix may steer a transmission toward the first UE and away from the second UE. The cell may send a reference signal based on the precoding matrix. The cell may also send a resource quality information (RQI) request to the first UE and may receive RQI determined by the first UE based on the reference signal. The cell may determine a modulation and coding scheme (MCS) based on the RQI. The cell may then send a data transmission to the first UE with the precoding matrix and in accordance with the MCS.

In one design of data transmission on the uplink with spatial interference mitigation, a UE may send a resource request to a serving cell with which the UE is in communication. The UE may receive SFI from a second cell with which the UE is not in communication. The UE may send a reference signal, e.g., based on the SFI. The UE may receive a grant comprising an MCS determined by the serving cell based on the reference signal. The UE may then send a data transmission to the serving cell based on the MCS and the SFI to reduce interference to the second cell.

Various aspects and features of the disclosure are described in further detail below.

BRIEF DESCRIPTION OF THE DRAWINGS

FIGS. 9 and 10 show a process and an apparatus, respectively, for transmitting data on the uplink with spatial interference mitigation.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
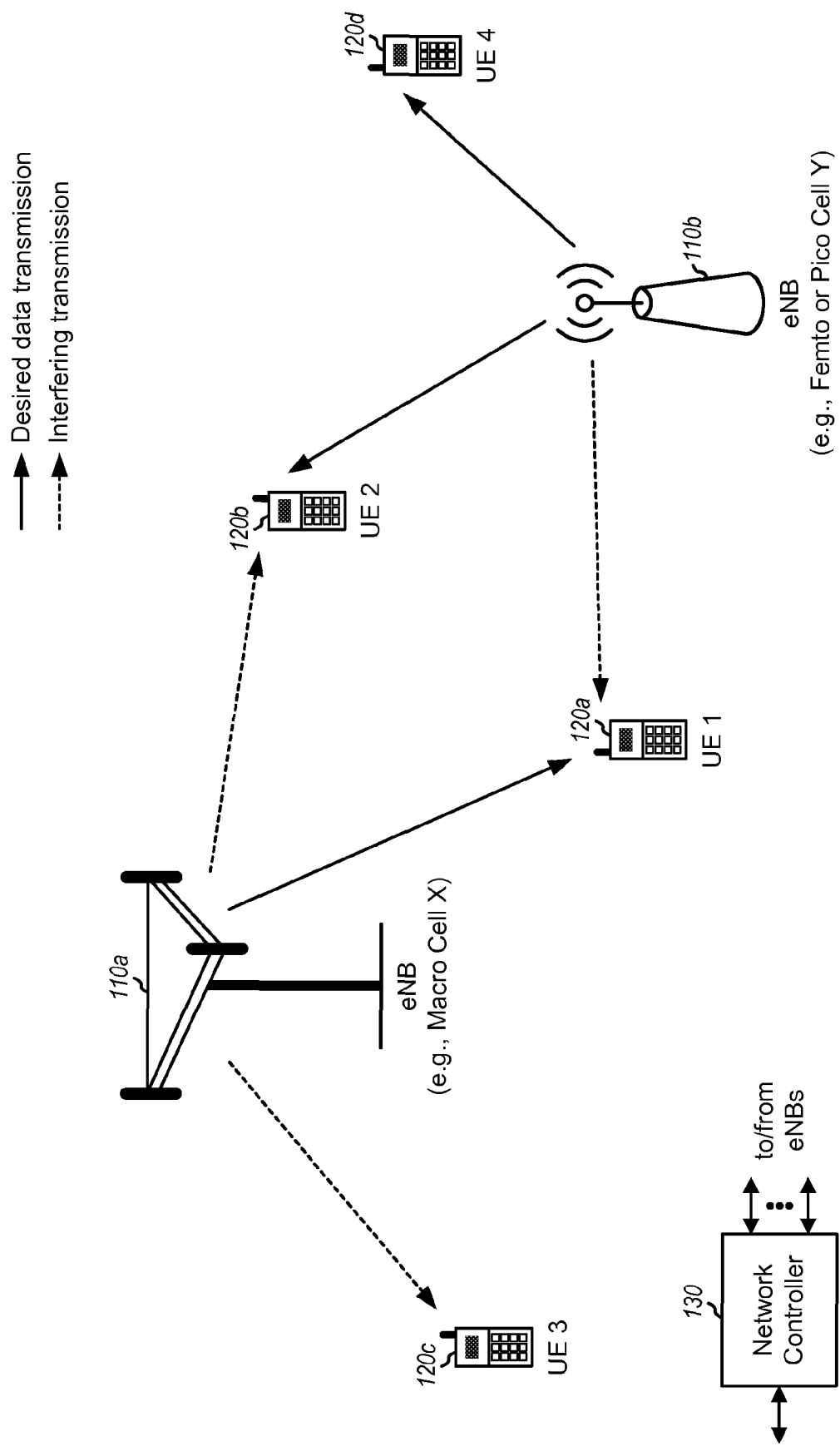
FIG. 1 shows a wireless communication network.

FIG. 1 shows a wireless communication network 100, which may be an LTE network or some other network. Wireless network 100 may include a number of evolved Node Bs (eNBs) and other network entities. For simplicity, only two eNBs 110a and 110b are shown in FIG. 1. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs for users in the home). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNB 110a may be a macro eNB for a macro cell X. eNB 110b may be a pico eNB for a pico cell Y or a femto eNB for a femto cell Y. An eNB may support one or multiple (e.g., three) cells.

Wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs.

Wireless network 100 may be a homogeneous network that includes eNBs of one type, e.g., only macro eNBs or only femto eNBs. Wireless network 100 may also be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs, and relays may have a lower transmit power level (e.g., 1 Watt). The techniques described herein may be used for both homogeneous and heterogeneous networks.

A network controller 130 may couple to a set of eNBs and provide coordination and control for these eNBs. Network controller 130 may communicate with eNBs 110 via a backhaul. eNBs 110 may also communicate with one another, e.g., directly or indirectly via wireless or wireline backhaul.

UEs may be dispersed throughout wireless network 100, and each UE may be stationary or mobile. For simplicity, only four UEs 120a, 120b, 120c and 120d are shown in FIG. 1 and are also referred to as UEs 1, 2, 3 and 4, respectively. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. In FIG. 1, a solid line with a single arrow indicates a desired data transmission from a serving cell to a UE, and a dashed line with a single arrow indicates an interfering transmission from an interfering cell to a UE. A serving cell is a cell designated to serve a UE on the downlink and/or uplink. A non-serving cell may be an interfering cell causing interference to a UE on the downlink and/or an interfered cell observing interference from the UE on the uplink. Uplink transmissions are not shown in FIG. 1 for simplicity.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands, and each subband may cover 1.08 MHz in LTE.

In LTE, the transmission timeline for each link may be partitioned into units of subframes. Each subframe may have a predetermined duration, e.g., 1 millisecond (ms), and may include two slots. Each slot may include six symbol periods for an extended cyclic prefix or seven symbol periods for a normal cyclic prefix. The available time frequency resources for each link may be partitioned into resource blocks. Each resource block may cover a particular time and frequency dimension, e.g., 12 subcarriers in one slot in LTE.

A UE may communicate with a serving cell in a dominant interference scenario, which is a scenario in which (i) the UE may observe high interference from one or more interfering cells on the downlink and/or (ii) the serving cell may observe high interference from one or more interfering UEs on the uplink. A dominant interference scenario may occur due to range extension, which is a scenario in which a UE connects to a cell with lower pathloss and lower geometry among all cells detected by the UE. For example, in FIG. 1, UE 2 may detect macro cell X and pico cell Y and may have lower received power for pico cell Y than macro cell X. Nevertheless, it may be desirable for UE 2 to connect to pico cell Y if the pathloss for cell Y is lower than the pathloss for macro cell X. This may result in less interference to the wireless network for a given data rate for UE 2. A dominant interference scenario may also occur due to restricted association. For example, in FIG. 1, UE 1 may be close to femto cell Y and may have high received power for this cell. However, UE 1 may not be able to access femto cell Y due to restricted association and may then connect to unrestricted macro cell X with lower received power. UE 1 may then observe high interference from femto cell Y on the downlink and may also cause high interference to cell Y on the uplink.

In an aspect, spatial interference mitigation may be performed for data transmission on the downlink to reduce interference to UEs. In one design, a UE may determine and provide spatial feedback information (SFI) for an interfering cell. The interfering cell may send its transmission based on the SFI to reduce interference to the UE.

The following types of information may be available:

Spatial feedback information—information used to reduce interference to an interfered station, Spatial nulling information—information used to steer a transmission in a direction away from an interfered station, Precoding information—information used to steer a transmission in a direction toward a target station, and Nulling gain information—information indicative of reduction in interference due to spatial interference mitigation.

For spatial interference mitigation on the downlink, the SFI may include (i) spatial nulling information for an interfering cell, which may be used by this cell to steer its transmission away from a UE, (ii) precoding information for a serving cell of the UE, which may be used by the interfering cell to steer its transmission away from the direction from the serving cell to the UE, (iii) nulling gain information, and/or (iv) other information. The different types of information for SFI may be determined as described below.

In one design, a UE may estimate a downlink channel response for an interfering cell, e.g., based on a reference signal or pilot sent by the cell on the downlink. The downlink channel estimate may be given by an R×T channel matrix, which may be given as:

$$H_{iu} = \begin{bmatrix} h_{1,1} & h_{1,2} & \ldots & h_{1,T} \\ h_{2,1} & h_{2,2} & \ldots & h_{2,T} \\ \vdots & \vdots & \ddots & \vdots \\ h_{R,1} & h_{R,2} & \ldots & h_{R,T} \end{bmatrix}, \quad \text{Eq (1)}$$

where $H_{iu}$ is a channel matrix for the downlink channel from interfering cell i to UE u, $h_{r,t}$, for r=1, ..., R and t=1, ..., T, is a complex gain between transmit antenna t at the interfering cell and receive antenna r at the UE, T is the number of transmit antennas at the interfering cell, and R is the number of receive antennas at the UE.

The channel matrix $H_{iu}$ includes R rows for the R receive antennas at the UE. Each row of $H_{iu}$ corresponds to one channel vector $h_{iu}$ for one receive antenna at the UE. If the UE is equipped with a single antenna, then $H_{iu}$ includes a single row for a single channel vector. A matrix may thus degenerate into a vector when there is only one row or one column. The downlink channel estimate may be obtained for all or a portion of the system bandwidth, e.g., for a subband on which the UE might be scheduled.

In a first SFI design, the SFI may comprise a channel direction indicator (CDI) for the interfering cell. The CDI for the interfering cell may be determined in various manners. In one design, the UE may quantize $H_{iu}$ based on a codebook of quantized channel matrices. The UE may evaluate each quantized channel matrix in the codebook, as follows:

$$Q_{H,l} = \|H_{iu}^H H_l\|, \quad \text{Eq (2)}$$

where $H_l$ is the l-th quantized channel matrix in the codebook, $Q_{H,l}$ is a metric indicative of the orthogonality between $H_l$ and $H_{iu}$, and "$H$" denotes a Hermitian or complex conjugate.

Metric $Q_{H,l}$ may be computed for each quantized channel matrix in the codebook. A quantized channel matrix $H_l$ that has the largest $Q_{H,l}$ and matches $H_{iu}$ as closely as possible may be selected and provided as the CDI for the interfering cell. The channel matrix $H_{iu}$ may thus be quantized to $H_l$ that is maximally correlated with $H_{iu}$ (rather than maximally orthogonal to $H_{iu}$). In another design, the UE may quantize each row of $H_{iu}$ based on a codebook of quantized channel vectors and may obtain a quantized channel vector for each row of $H_{iu}$. The UE may also quantize $H_{iu}$ in other manners. The size of the codebook of quantized channel matrices or vectors may be selected to obtain good nulling performance while reducing signaling overhead. The CDI for the interfering cell may include an index of the quantized channel matrix, an index of each quantized channel vector, and/or other information. The UE may send the CDI as SFI to the interfering cell. Since the reported $H_l$ indicates the direction from the interfering cell to the UE, the interfering cell may select a precoding matrix to be as orthogonal to $H_l$ as possible in order to reduce interference to the UE.

In a second SFI design, the SFI may comprise a precoding matrix indicator (PMI) for the interfering cell. The PMI for the interfering cell may be determined in various manners. In one design, the UE may select a precoding matrix, from a codebook of precoding matrices, that is as orthogonal to $H_{iu}$ as possible. The UE may evaluate each precoding matrix in the codebook, as follows:

$$Q_{P,l} = \|H_{iu} P_l\|, \quad \text{Eq (3)}$$

where $P_l$ is the l-th precoding matrix in the codebook, and $Q_{P,l}$ is a metric indicative of the orthogonality between $P_l$ and $H_{iu}$.

The UE may select a precoding matrix that has the smallest $Q_{P,l}$ and is the most orthogonal to $H_{iu}$. The UE may send an index of this precoding matrix as SFI for the interfering cell. The selected precoding matrix may include the 'best' set of linear combinations of effective antennas resulting in the most interference reduction at the UE.

In another design, the UE may compute a precoding matrix $P_{iu}$ that is as orthogonal to $H_{iu}$ as possible. The UE may perform eigenvalue decomposition, as follows:

$$H_{iu}^H H_{iu} = E \Lambda E, \quad \text{Eq (4)}$$

where E is a T×T unitary matrix of eigenvector of $H_{iu}$, and $\Lambda$ is a T×T diagonal matrix of eigenvalues of $H_{iu}$.

Unitary matrix E is characterized by the property $E^H E = I$, where I is an identity matrix. The columns of E are orthogonal to one another, and each column has unit power. The downlink channel from the interfering cell to the UE has S eigenmodes, where S≤min {R, T}. The T columns of E are referred to as T eigenvectors and may be used to send data on the eigenmodes of $H_{iu}$. The diagonal elements of $\Lambda$ are eigenvalues that represent the power gains of the eigenmodes of $H_{iu}$. The T diagonal elements of $\Lambda$ are associated with the T eigenvectors of E. If R<T, then $\Lambda$ may include up to R non-zero diagonal elements, and zeros for the remaining diagonal elements. The eigenvectors in E corresponding to the zero diagonal elements in $\Lambda$ are orthogonal to $H_{iu}$ and may be included in a precoding matrix $P_{iu}$. The UE may quantize $P_{iu}$ (e.g., as described above for $H_{iu}$) to obtain SFI for the interfering cell. The UE may send the SFI to the interfering cell, which may then select a precoding matrix to match the quantized $P_{iu}$ as much as possible to reduce interference to the UE.

In yet another design, the UE may be equipped with multiple receive antennas and may determine a precoding matrix for the interfering cell by taking into account its receive nulling capability. The UE may derive a spatial filter matrix based on a channel matrix for a serving cell. The UE may then perform receiver spatial processing for a transmission from the serving cell with the spatial filter matrix. The UE may evaluate each precoding matrix in a codebook with an assumption that the spatial filter matrix will be used by the UE. The UE may select a precoding matrix that can provide the best receiver performance with the spatial filter matrix. The UE may provide the selected precoding matrix as SFI for the interfering cell.

In a third SFI design, the SFI for the interfering cell may comprise a CDI or a PMI for the serving cell. The UE may estimate the downlink channel for the serving cell and may determine the CDI or PMI based on a downlink channel matrix $H_{su}$ for the serving cell. The CDI may include an index of a quantized channel matrix, an index of each quantized channel vector, etc. The PMI may include an index for a precoding matrix or vector to be used by the serving cell for the UE, etc. The UE may send the CDI or PMI for the serving cell as SFI for the interfering cell. Since the CDI/PMI for the serving cell indicates the direction from the serving cell to the UE, the interfering cell may select a precoding matrix to be as orthogonal to the CDI/PMI for the serving cell as possible in order to reduce interference to the UE. For example, the interfering cell may schedule a UE that may be minimally impacted by the beam selected by the serving cell.

In another design, the SFI for the interfering cell may comprise a set of orthogonal vectors, which may assume certain receiver spatial processing at the UE. For example, the SFI may comprise one or more vectors that may be orthogonal to one or more principal eigenvectors of the channel matrix $H_{iu}$, which may be obtained as shown in equation (4). As another example, certain receiver spatial processing may be assumed for the UE for data transmission from the serving cell. The SFI may then comprise one or more vectors that may be orthogonal to an effective channel between the transmit antennas at the interfering cell and the outputs of the receiver spatial processing at the UE.

In general, spatial nulling information for the interfering cell may comprise CDI or PMI for the interfering cell, CDI or PMI for the serving cell, and/or some other information. The interfering cell may use the spatial nulling information to determine a precoding matrix that can steer its transmission away from the direction of the UE.

In one design, the SFI may comprise a transmit nulling gain (TNG) resulting from the interfering cell applying the spatial nulling information provided by the UE. The UE may estimate (i) interference power $I_{SFI}$ from the interfering cell with this cell applying the spatial nulling information and (ii) interference power $I_{OL}$ from the interfering cell with this cell not applying the spatial nulling information (or operating open loop). The UE may determine the transmit nulling gain as a ratio of $I_{SFI}$ to $I_{OL}$. The transmit nulling gain may thus indicate the amount of reduction in interference power from the interfering cell if the spatial nulling information is used by this cell instead of open loop transmission. The interfering cell may determine a transmit power level to use to obtain a target interference level for the UE. The interfering cell may be able to increase this transmit power level by the transmit nulling gain when the spatial nulling information is applied by the cell.

In another design, the SFI may comprise a receive nulling gain (RNG) for the interfering cell resulting from the UE performing receiver spatial processing for the serving cell. This design may be especially applicable if the interfering cell is equipped with a single transmit antenna and is unable to perform steering for spatial nulling. The receive nulling gain may indicate the amount of reduction in interference power due to the UE performing receiver spatial processing and may be determined as described below. The interfering cell may then determine its transmit power level based on the receive nulling gain, e.g., to achieve the target interference level for the UE. The receive nulling gain may also be factored into the target interference level for the UE. The interfering cell may not need to know the value of the receive nulling gain but rather the resulting target interference level for the UE.

The UE may send the SFI for the interfering cell to support spatial interference mitigation. The SFI may comprise a CDI or a PMI for the interfering cell, a CDI or a PMI for the serving cell, a transmit nulling gain, a receive nulling gain, and/or other information. In one design, the UE may send the SFI directly to the interfering cell. In another design, the UE may send the SFI to the serving cell, which may forward the SFI to the interfering cell, e.g., via Layer 3 (L3) signaling exchanged through the backhaul. The UE may send the SFI at a sufficiently fast rate, which may be dependent on mobility of the UE and possibly other factors. For example, the UE may send the SFI at a faster rate to an interfering macro cell to enable transmit nulling by this cell under low mobility condition for the UE. The UE may send the SFI at a slower rate to an interfering pico or femto cell under static or quasi-static condition for the UE. The UE may also send SFI whenever requested, as described below. In general, the SFI should correspond to a relatively recent channel estimate in order to obtain good transmit nulling.

In another aspect, spatial interference mitigation may be performed for data transmission on the uplink to reduce interference to cells. Spatial interference mitigation for the uplink may be performed in different manners depending on whether the UEs are equipped with one or multiple transmit antennas.

In one design, an interfering UE equipped with multiple transmit antennas may spatially steer its transmission in order to reduce interference to a cell. The cell may estimate the uplink channel from the interfering UE to the cell and may determine spatial nulling information based on the estimated uplink channel, e.g., using any of the designs described above for the downlink. The cell may also determine a transmit nulling gain, e.g., as described above for the downlink. The SFI for the interfering UE may comprise the spatial nulling information, the transmit nulling gain, etc. The cell may send the SFI to the interfering UE. The interfering UE may use the SFI to spatially steer its transmission in a direction away from the cell and/or to reduce its transmit power.

In another design, a cell may perform receive interference nulling for an interfering UE equipped with a single transmit antenna. The cell may select a UE to serve by taking into account the interfering UE.

The cell may obtain received symbols, which may be expressed as:

$$r_s = h_{us} s_u + h_{js} s_j + n_s = h_{us} s_u + n_{ts}, \quad \text{Eq (5)}$$

where $s_u$ is a data symbol sent by served UE u,
$s_j$ is a data symbol sent by interfering UE j,
$h_{us}$ is a channel vector for the uplink channel from served UE u to cell s,
$h_{js}$ is a channel vector for the uplink channel from interfering UE j to cell s,
$r_s$ is a vector of received symbols at cell s,
$n_{ts}$ is a vector of total noise and interference at cell s, and
$n_s$ is a vector of total noise and interference, except from UE j, at cell s.

The cell may perform receiver spatial processing to recover the data symbols from the served UE and to suppress/null the data symbols from the interfering UE. The cell may select a spatial filter vector m that (i) matches $h_{us}$ for the served UE as closely as possible and (ii) is as orthogonal as possible to $h_{js}$ for the interfering UE. In one design, the spatial filter vector m may be determined based on a minimum mean square error (MMSE) receive filter and may be computed as $m = a R_{nn}^{-1}$ $h_{us}$, where a is a scaling factor and $R_{nn}$ is a covariance matrix of the total noise and interference. In another design, the cell may evaluate each entry in a codebook of spatial filter vectors and may select a spatial filter vector with the best signal-to-noise-and-interference ratio (SINR). The cell may also determine a spatial filter vector in other manners.

The cell may perform receiver spatial processing, as follows:

$$\hat{s}_u = m\,r_s = s_u + n_s,  \quad\quad\quad\quad\quad \text{Eq (6)}$$

where $\hat{s}_u$ is a detected symbol for served UE u, and $n_s$ is the noise and interference after the receiver spatial processing at cell s.

The processing shown in equation (6) may be performed for each subcarrier in each symbol period.

The cell may determine the receive nulling gain for the interfering UE resulting from the cell performing receiver spatial processing for the served UE. The cell may estimate (i) interference power $I_{RXP}$ from the interfering UE with the cell performing receiver spatial processing and (ii) interference power $I_{no\_RXP}$ from the interfering UE without receiver spatial processing by the cell. The cell may determine the receive nulling gain as a ratio of $I_{RXP}$ to $I_{no\_RXP}$. The receive nulling gain may thus indicate the amount of reduction in interference power due to the cell performing receiver spatial processing. The cell may provide the receive nulling gain to the interfering UE. The cell or the interfering UE may calculate a target transmit power level for the UE by taking into account the receive nulling gain to obtain a target interference level for the cell. The interfering UE may be able to increase its transmit power by the receive nulling gain.

The cell may determine the receive nulling gain for a specific pair of served UE and interfering UE. If the UE pairing is not desirable, then the cell may calculate the expected (e.g., average) receive nulling gain or the worst case receive nulling gain based on a variety of UEs that might be served and their channel conditions. The use of receive nulling gain may be especially applicable in femto deployments in which each femto cell may serve only one or few UEs and may have only one or few interfering UEs. Hence, a limited number of pairs of served UE and interfering UE may be present in a femto deployment.

The cell may send the SFI for the interfering UE. The SFI may comprise (i) spatial nulling information and/or a transmit nulling gain if the UE is equipped with multiple antennas, (ii) a receive nulling gain if the UE is equipped with a single antenna, and/or (iii) other information. In one design, the cell may send the SFI directly to the interfering UE. In another design, the cell may send the SFI to a serving cell of the interfering LTE, e.g., via L3 signaling exchanged through the backhaul. The serving cell may then send the SFI to the interfering UE. The cell may send the SFI at a suitable rate. Quantization for the SFI may be selected to obtain good spatial nulling. The same or different levels of quantization may be used for the SFI sent over the air and the SFI forwarded via the backhaul.

Spatial interference mitigation for the downlink and uplink may be performed in various manners. In one design, spatial interference mitigation for a given link may be triggered when warranted (instead of being performed all the time). For example, spatial interference mitigation may be triggered when a dominant interferer is detected. In one design, SFI may be sent at a suitable rate to support spatial interference mitigation. In another design, SFI may be sent when triggered by an event, which may reduce signaling overhead. For example, SFI may be sent if there is a noticeable change in the spatial nulling information, the transmit nulling gain, and/or the receive nulling gain, e.g., when the change in the spatial nulling information or the nulling gain exceeds a certain threshold.

The spatial interference mitigation techniques described herein may be used for frequency division duplexed (FDD) networks as well as time division duplexed (TDD) networks. For FDD, the downlink and uplink may be allocated separate frequency channels, and a channel response for the downlink may not correlate well with a channel response for the uplink. For an FDD network, a UE may estimate a downlink channel response for an interfering cell, determine SFI based on the downlink channel response, and send the SFI to the interfering cell, as described above. A cell may also estimate an uplink channel response for an interfering UE, determine SFI based on the uplink channel response, and send the SFI to the interfering UE, as also described above. For TDD, the downlink and uplink may share the same frequency channel, and a channel response for the downlink may be correlated with a channel response for the uplink. For a TDD network, an interfering cell may estimate an uplink channel response for a UE based on a reference signal from the UE, estimate a downlink channel response based on the uplink channel response, and use the downlink channel response to steer its transmission in a direction away from the UE. An interfering UE may also estimate a downlink channel response for a cell based on a reference signal from the cell, estimate an uplink channel response based on the downlink channel response, and use the uplink channel response to steer its transmission in a direction away from the cell. An interfering station may thus be able to obtain SFI based on its channel estimate, without having to receive the SFI from an interfered station.

Spatial interference mitigation may be supported for a given link using various signaling messages and timeliness Some exemplary timelines and messages for spatial interference mitigation on the downlink and uplink are described below.

Figure 2:
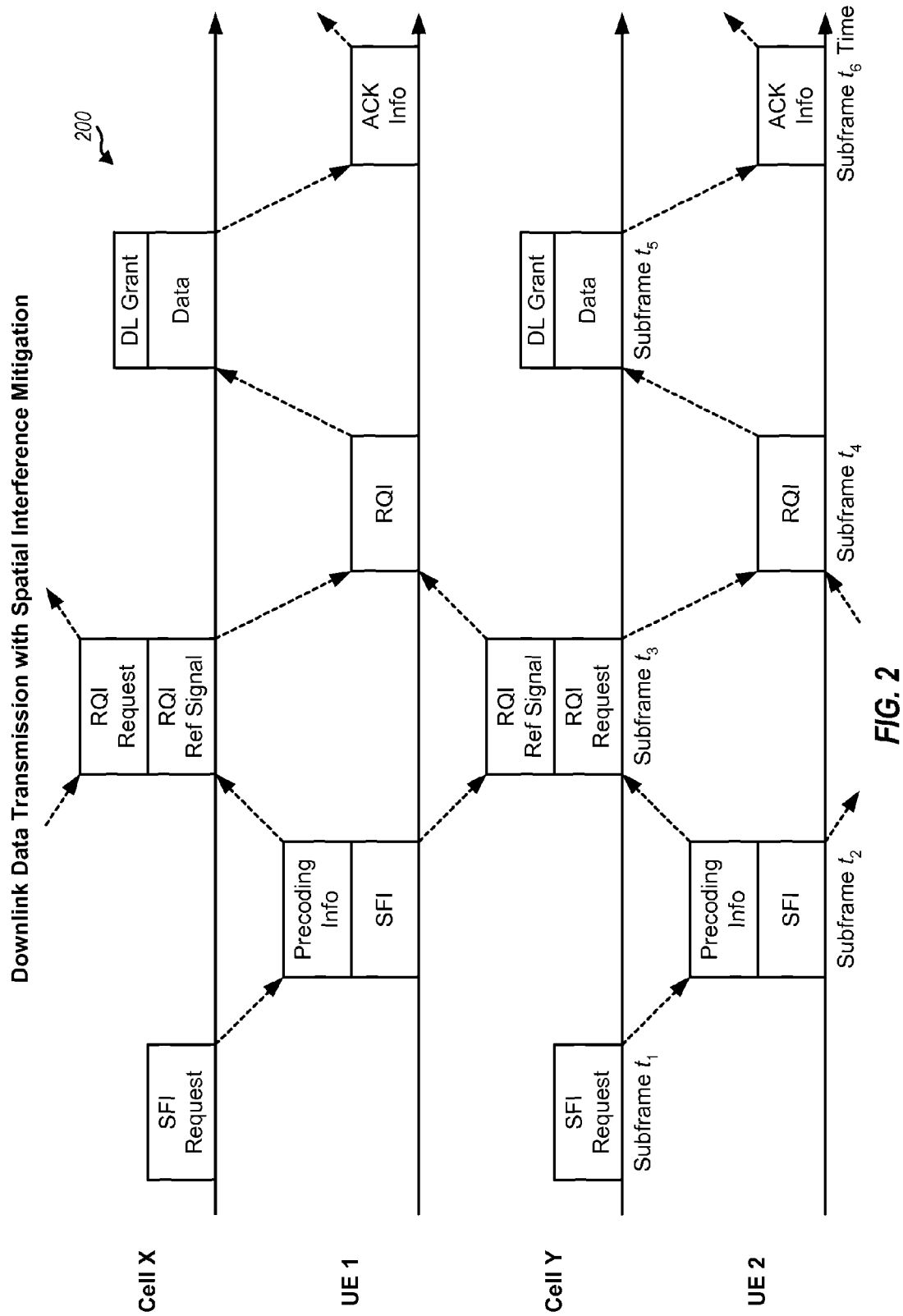
FIG. 2 shows downlink data transmission with spatial interference mitigation.

FIG. 2 shows a design of a downlink data transmission scheme 200 with spatial interference mitigation. For simplicity, FIG. 2 shows only two cells X and Y and two UEs 1 and 2 in FIG. 1. Cell X is a serving cell for UE 1 and is an interfering cell to UE 2. Cell Y is a serving cell for UE 2 and is an interfering cell to UE 1.

Cell X may have data to send to UE 1 and may have knowledge that UE 1 is observing high interference on the downlink. For example, cell X may receive pilot measurement reports from UE 1, and the reports may indicate and/or identify strong interfering cell Y. Cell X may send an SFI request to UE 1 to ask UE 1 to (i) determine and send SFI to interfering cell Y and/or (ii) determine and send feedback to serving cell X. The SFI request may include various types of information, as described below. Similarly, cell Y may have data to send to UE 2 and may have knowledge that UE 2 is observing high interference on the downlink. Cell Y may then send an SFI request to UE 2 to ask UE 2 to determine and send SFI to interfering cell X.

UE 1 may receive the SFI request from its serving cell X. In response to the SFI request, UE 1 may estimate the downlink channel response for interfering cell Y and may determine SFI for cell Y based on the downlink channel response, e.g., as described above. UE 1 may then send the SFI to interfering cell Y. UE 1 may also estimate the downlink channel response for its serving cell X, determine precoding information (e.g., CDI or PMI) for cell X, and send the precoding information to cell X. Similarly, UE 2 may receive the SFI request from its serving cell Y, estimate the downlink channel response for interfering cell X, determine SFI for cell X based on the downlink channel response, and send the SFI to cell X. UE 2 may also estimate the downlink channel response for its serving cell Y, determine precoding information for cell Y, and send the precoding information to cell Y.

Cell X may receive the precoding information from UE 1 and the SFI from interfered UE 2. Cell X may determine a precoding matrix $P_X$ to use for data transmission based on the precoding information from UE 1 and the SFI from UE 2. Cell X may also determine a transmit power level $P_{data,X}$ to use for data transmission based on the transmit nulling gain from UE 2, the target interference level for UE 2, and/or other information. Cell X may then transmit a resource quality indicator (RQI) reference signal with precoding matrix $P_X$ and at a transmit power level $P_{RQI-RS,X}$, which may be equal to $P_{data,X}$ or a scaled version of $P_{data,X}$. A reference signal or pilot is a transmission that is known a priori by a transmitter and a receiver. The RQI reference signal may also be referred to as a power decision pilot. The RQI reference signal may be a steered reference signal sent with a precoding matrix and/or may have a variable transmit power level. Cell X may also send an RQI request to UE 1 and/or other UEs served by cell X. The RQI request may ask UE 1 to estimate the channel quality for cell X based on the RQI reference signal and to send RQI to cell X. Similarly, cell Y may determine a precoding matrix $P_Y$ to use for data transmission based on the precoding information from UE 2 and the SFI from UE 1. Cell Y may also determine a transmit power level $P_{data,Y}$ to use for data transmission based on the transmit nulling gain from UE 1, the target interference level for UE 1, and/or other information. Cell Y may then transmit an RQI reference signal with precoding matrix $P_Y$ and at a transmit power level $P_{RQI-RS,Y}$, which may be equal to $P_{data,Y}$ or a scaled version of $P_{data,Y}$. Cell Y may also send an RQI request to UE 2 and/or other UEs served by cell Y.

UE 1 may receive the RQI reference signals from cells X and Y as well as the RQI request from its serving cell X. In response to the RQI request, UE 1 may estimate the channel quality for serving cell X based on the RQI reference signals from all cells. The RQI reference signals may allow UE 1 to more accurately estimate the channel quality that UE 1 can expect for data transmission from serving cell X by taking into account the precoding matrices and transmit power levels that the cells expect to use. UE 1 may determine RQI, which may comprise an SINR estimate for the channel quality, a modulation and coding scheme (MCS) determined based on the SINR estimate, etc. UE 1 may send the RQI to its serving cell X. Similarly, UE 2 may receive the RQI reference signals from cells X and Y as well as the RQI request from its serving cell Y. UE 2 may estimate the channel quality for serving cell Y, determine RQI, and send the RQI to cell Y.

Cell X may receive the RQI from UE 1, schedule UE 1 for data transmission, select an MCS based on the RQI, and process data for UE 1 in accordance with the selected MCS. Cell X may generate a downlink (DL) grant, which may also be referred to as a resource assignment, a scheduling grant, etc. The downlink grant may indicate the assigned resources, the selected MCS, etc. Cell X may send the downlink grant and a data transmission to UE 1. UE 1 may receive the downlink grant and the data transmission and may decode the received transmission in accordance with the selected MCS. UE 1 may generate acknowledgement (ACK) information, which may indicate whether the data is decoded correctly or in error. UE 1 may send the ACK information to its serving cell X. Cell Y may similarly send a data transmission to UE 2.

Figure 3A:
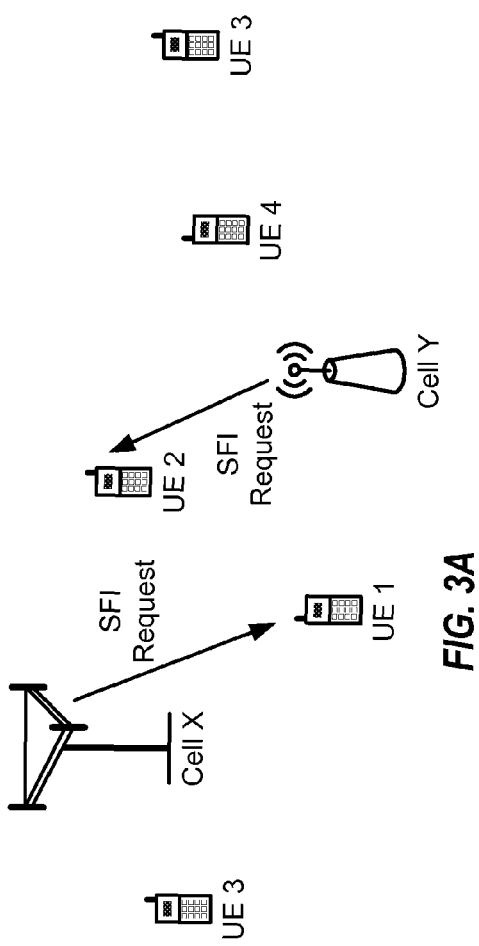
FIGS. 3A to 3D illustrate downlink data transmission in FIG. 2.
Figure 3B:
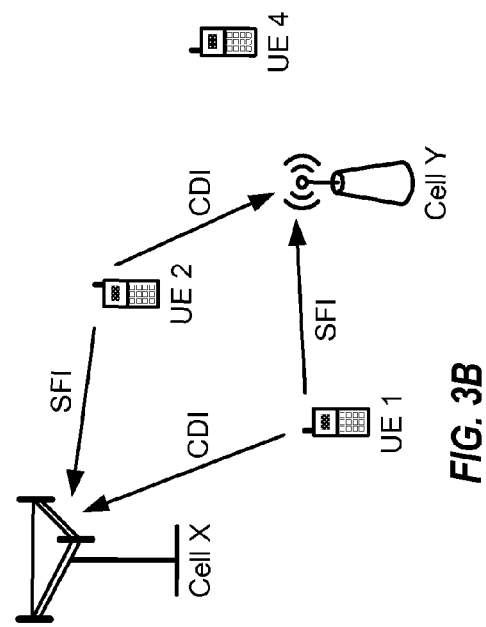

FIGS. 3A to 3D show transmissions of messages for the downlink data transmission scheme in FIG. 2. Each cell may initially select one or more UEs for possible data transmission on a set of time frequency resources (e.g., one or more resource blocks). The initial UE selection may be based on various factors such as the priorities of the UEs in different cells, channel information for the UEs, downlink buffer status of the cell, quality-of-service (QoS) requirements, network optimization criteria (e.g., throughput, fairness), etc. The channel information for the UEs may be long-term and may be exchanged between the cells via the backhaul, e.g., an X2 interface in LTE. The selected UEs may be considered as tentatively scheduled UEs. Each cell may send an SFI request to each selected UE, as shown in FIG. 3A. Each selected UE may determine and send precoding information (e.g., CDI) to its serving cell and may also determine and send SFI to each interfering cell indicated in the SFI request for that UE, as shown in FIG. 3B.

Each cell may receive the precoding information from each selected UE as well as the SFI from each interfered UE. Each cell may honor or dismiss the SFIs from the interfered UEs, e.g., based on utility levels, priorities, etc. Each cell may schedule one or more UEs for data transmission on a set of time frequency resources based on various factors such as those described above for initial UE selection. For each cell, the scheduled UE(s) may be the same as or different from the initially selected UE(s). A given cell may not be able to apply a suitable precoding matrix for a selected UE, e.g., due to scheduling conflict between that cell and another cell, and may then schedule another UE. For example, cell Y may initially select UE 2, may be unable to use a suitable precoding matrix for UE 2 due to scheduling conflict with cell X, and may then schedule UE 4, which may be less affected by the interference from cell X. This flexibility may allow cells to schedule UEs that may benefit from the spatial beams available to the cells.

Figure 3C:
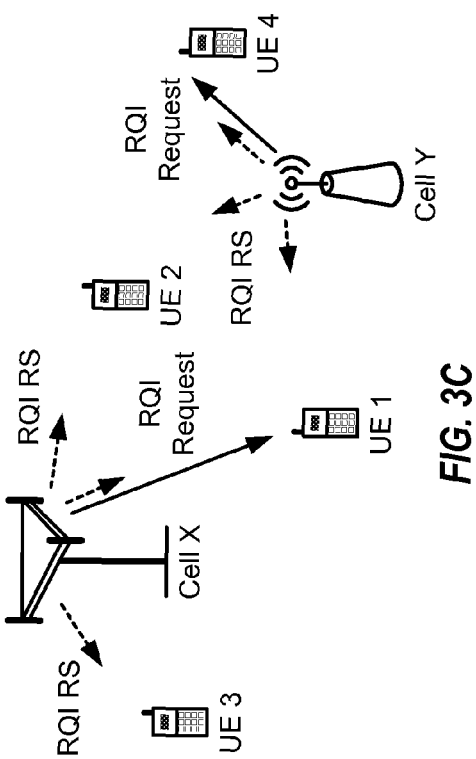

Each cell may determine a precoding matrix to use for the scheduled UE(s) and may also determine a transmit power level to use for data transmission. Each cell may then send an RQI reference signal as well as an RQI request to each scheduled UE, as shown in FIG. 3C. A given cell may send RQI requests and SFI requests to different UEs. For example, cell Y may send an SFI request to UE 2 and may later send an RQI request to UE 4. A cell may also send RQI requests to multiple UEs for the same set of time frequency resources to allow the cell to make an opportunistic scheduling decision based on the RQIs from these UEs. Each scheduled UE may determine and send RQI to its serving cell, as shown in FIG. 3D.

Figure 3D:
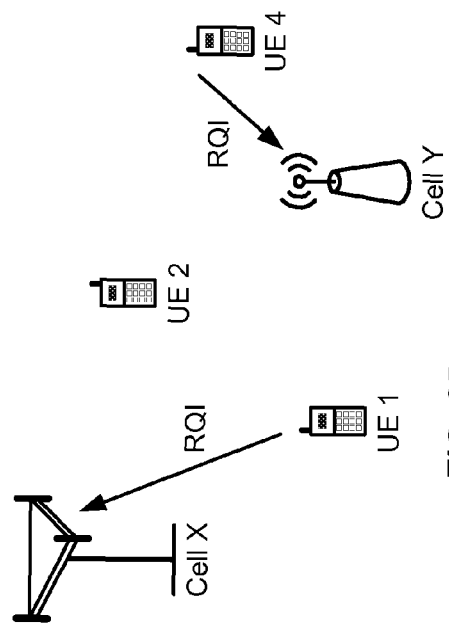

In the design shown in FIGS. 2 to 3D, a serving cell may send an SFI request to a UE to ask the UE to send SFI to an interfering cell. In another design, an interfering cell may send an SFI request to a UE to ask the UE to send SFI to that cell. The SFI request may also be sent by other entities. For example, the UE may autonomously decide to send SFI to a strong interfering cell.

Figure 4:
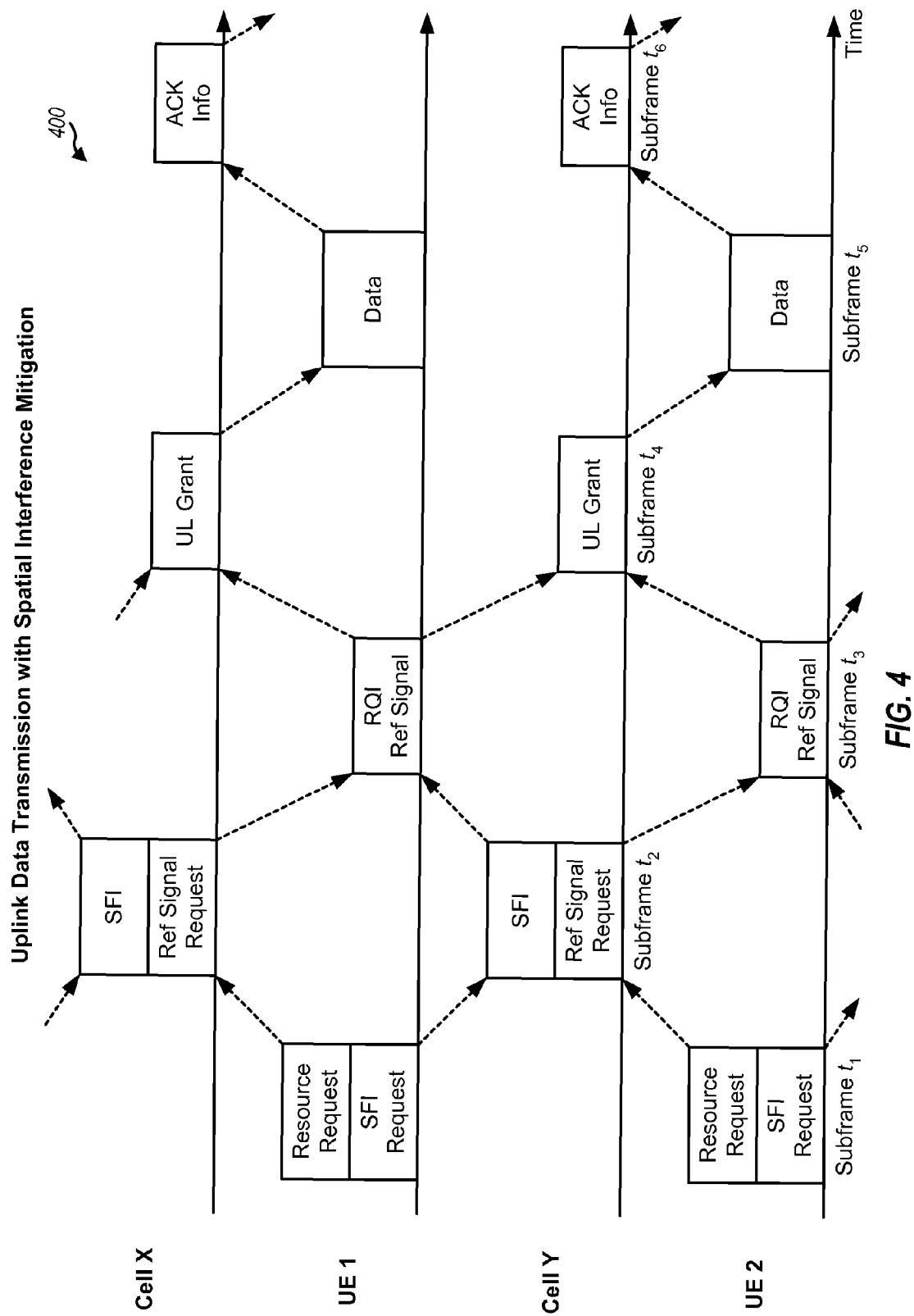
FIG. 4 shows uplink data transmission with spatial interference mitigation.

FIG. 4 shows a design of an uplink data transmission scheme 400 with spatial interference mitigation. For simplicity, FIG. 4 shows only two cells X and Y and two UEs 1 and 2 in FIG. 1. Cell X is a serving cell for UE 1 and is interfered by UE 2 on the uplink. Cell Y is a serving cell for UE 2 and is interfered by UE 1 on the uplink.

UE 1 may have data to send to its serving cell X and may send a resource request. The resource request may indicate the priority of the request, the amount of data to send by UE 1, etc. In one design that is not shown in FIG. 4, UE 1 does not send an SFI request to interfered cell Y. For this design, interfered cell Y may send SFI to UE 1 if cell Y determines that spatial interference mitigation by UE 1 is desired. In another design that is shown in FIG. 4, UE 1 may send an SFI request to interfered cell Y to ask cell Y to determine and send SFI to UE 1. UE 1 may also send a reference signal along with the resource request to allow each cell to determine spatial nulling information or precoding information for UE 1.

Serving cell X may receive the resource request from UE 1 and possibly an SFI request from UE 2. Cell X may send a reference signal request to UE 1 to ask UE 1 to transmit an RQI reference signal. Cell X may also determine precoding information (e.g., a CDI or a PMI) for UE 1 and may send the precoding information to UE 1 (not shown in FIG. 4). Cell Y may receive the SFI request from UE 1, determine SFI based on an uplink transmission from UE 1, and send the SFI to UE 1. If UE 1 is equipped with a single transmit antenna, then the SFI may comprise a receive nulling gain and/or other information for UE 1. If UE 1 is equipped with multiple transmit antennas, then the SFI may comprise spatial nulling information (e.g., a CDI or a PMI for cell Y) to allow UE 1 to steer its transmission in a direction away from cell Y.

UE 1 may receive the reference signal request from its serving cell X, the SFI from interfered cell Y, and possibly precoding information from serving cell X. If UE 1 is equipped with a single transmit antenna, then UE 1 may determine a transmit power level $P_{data,1}$ to use for data transmission based on the receive nulling gain from cell Y, the target interference level for cell Y, and/or other information. If UE 1 is equipped with multiple transmit antennas, then UE 1 may determine a precoding matrix $P_1$ to use for data transmission based on the precoding information from cell X and the spatial nulling information from cell Y. UE 1 may then transmit an RQI reference signal at a transmit power level $P_{RQI-RS,1}$ and possibly with precoding matrix $P_1$. $P_{RQI-RS,1}$ may be equal to $P_{data,1}$ or a scaled version of $P_{data,1}$.

Serving cell X may receive the RQI reference signals from UE 1 and UE 2. Cell X may determine the channel quality for UE 1 based on the RQI reference signals and may select an MCS for UE 1 based on the channel quality. Cell X may generate an uplink grant, which may include the selected MCS, the assigned resources, the transmit power level to use for the assigned resources, and/or other information. Cell X may send the uplink grant to UE 1. UE 1 may receive the uplink grant, process data in accordance with the selected MCS, and send a data transmission on the assigned resources. Cell X may receive the data transmission from UE 1, decode the received transmission, determine ACK information based on the decoding result, and send the ACK information to UE 1.

In the design shown in FIG. 2, an SFI request may be sent in downlink subframe $t_1$, SFI may be sent in uplink subframe $t_2$, an RQI request and an RQI reference signal may be sent in downlink subframe $t_3$, RQI may be sent in uplink subframe $t_4$, a downlink grant and data may be sent in downlink subframe $t_5$, and ACK information may be sent in uplink subframe $t_6$. Subframes $t_1$, $t_2$, $t_3$ $t_4$, $t_5$ and $t_6$ may be separated by the same or different number of subframes, e.g., by two to four subframes between consecutive subframes used for transmission. In one design, downlink subframes $t_1$, $t_3$ and $t_5$ may belong in one downlink interlace, which may include downlink subframes spaced apart by L subframes, where L may be any suitable value. Uplink subframes $t_2$, $t_4$ and $t_6$ may belong in one uplink interlace, which may include uplink subframes spaced apart by L subframes.

In the design shown in FIG. 4, a resource request and an SFI request may be sent in uplink subframe $t_1$, SFI and a reference signal request may be sent in downlink subframe $t_2$, an RQI reference signal may be sent in uplink subframe $t_3$, an uplink grant may be sent in downlink subframe $t_4$, data may be sent in uplink subframe $t_5$, and ACK information may be sent in downlink subframe $t_6$. Subframes $t_1$, $t_2$, $t_3$ $t_4$, $t_5$ and $t_6$ may be separated by the same or different number of subframes. In one design, uplink subframes $t_1$, $t_3$ and $t_5$ may belong in one uplink interlace, and downlink subframes $t_2$, $t_4$ and $t_6$ may belong in one downlink interlace.

In one design, the resources for messages and data transmissions may be explicitly conveyed. For example, in FIG. 2, an SFI request may ask for SFI for specific data resources, an RQI request may ask for RQI for specific data resources, etc. In another design, the resources used to send messages, the resources used to send reference signals, and the resources used to send data transmissions may be implicitly conveyed. For example, in FIG. 2, an SFI request may be sent on downlink resources $R_{SFI-REQ}$ and may ask for SFI for downlink data resources $R_{DATA}$, which may be linked to $R_{SFI-REQ}$. The RQI reference signals of all cells corresponding to the same data resources $R_{DATA}$ may overlap, so that UEs can measure the total interference observed by these UEs from all cells. The SFI may be sent on uplink resources $R_{SFI}$, which may be linked to downlink resources $R_{SFI-REQ}$ used to send the SFI request or may be explicitly indicated in the SFI request. An RQI request may be sent on downlink resources $R_{RQI-REQ}$ and may ask for RQI for downlink resources $R_{RQI-RS}$, which may be linked to $R_{RQI-REQ}$. The RQI may be determined based on an RQI reference signal sent on downlink resources $R_{RQI-RS}$ and may be sent on uplink resources $R_{RQI}$, which may be linked to downlink resources $R_{RQI-REQ}$ or may be explicitly indicated in the RQI request. The RQI reference signal may be sent on downlink resources $R_{RQI-RS}$ and may convey a precoding matrix and a transmit power level to be used on downlink data resources $R_{DATA}$.

The messages and transmissions for spatial interference mitigation may comprise various types of information. For example, the messages and transmissions for spatial interference mitigation on the downlink may include the information described below.

In one design, an SFI request sent to a UE may include one or more of the following:

Each interfering cell to which the UE should send SFI,
Time frequency resources on which to determine SFI,
Uplink resources to use to send the SFI,
Priority of the SFI request,
Target interference level, and/or
Other information.

The interfering cells may be identified based on pilot measurement reports sent by the UE to the serving cell. In one design, each interfering cell may be identified by a short cell identifier (ID), e.g., 2-3 bits for each interfering cell, in order to reduce signaling overhead. In another design, a bitmap may be used for a set of interfering cells to be reported by the UE, and each interfering cell may be associated with a bit in the bitmap. The number of interfering cells may be limited (e.g., to six cells) in order to reduce signaling overhead. The interfering cells may also be limited to cells with received power within a predetermined value (e.g., within 10 dB) of the received power of the serving cell. The UE may send SFI to each interfering cell indicated in the SFI request.

The time frequency resources on which to determine SFI may be all or a portion of the system bandwidth, e.g., a subband, one or more resource blocks, etc. The resources may be explicitly indicated by the SFI request (e.g., by a resource index) or implicitly conveyed (e.g., linked to the resources on which the SFI request is sent).

The priority of the SFI request may be determined based on various factors. In one design, the priority may be determined based on a medium to long-term utility function. The priority may also include a short-term priority differential over the long-term priority. The priority may be quantized to few values (e.g., 1 to 2 bits) to reduce signaling overhead. In one design, the priority may be determined by the type of data to send, e.g. best effort (BE), assured-forwarding (AF), expedited-forwarding (EF), etc.

In one design, SFI for an interfering cell may include one or more of the following:
  Spatial nulling information, e.g., CDI or PMI for the interfering cell, CDI or PMI for the serving cell, etc.,
  Transmit nulling gain and/or receive nulling gain,
  Time frequency resources on which to reduce interference by the interfering cell,
  Target interference level for the UE,
  Priority of the request to reduce interference by the interfering cell,
  Type of feedback information, and/or
  Other information.

The CDI or PMI for the interfering cell and the CDI or PMI for the serving cell may be determined as described above. The CDI/PMI for each cell may be provided with sufficient resolution (e.g., 8 to 10 bits) to achieve the desired transmit nulling performance. The serving cell may request the UE to send CDI/PMI for the interfering cell and CDI/PMI for the serving cell at the same time to enable accurate scheduling coordination between different cells. The transmit and/or receive nulling gain may also be determined and reported, as described above.

The time frequency resources on which to reduce interference may be explicitly indicated by the SFI (e.g., with a resource index) or implicitly conveyed (e.g., linked to the resources on which the SFI is sent). The time frequency resources may cover one subband in one subframe, multiple subbands in one subframe, a subband over multiple subframes, or some other time-frequency dimension. The priority in the SFI may be equal to the priority in the SFI request. In a wideband deployment (e.g., more than 5 MHz bandwidth), separate SFI may be sent for each (e.g., 5 MHz) bandwidth portion to reduce feedback payload. The type of feedback information may indicate whether the SFI comprises (i) CDI corresponding to the channel between the interfering cell and the UE and (ii) PMI that may be used by the serving cell of the UE. Either one or both types of information may be useful for making scheduling decision at the interfering cell.

In one design, an RQI request sent to a UE may include one or more of the following:
  Time frequency resources on which to determine RQI,
  Uplink resources to use to send the RQI,
  Priority of the RQI request, and/or
  Other information.

In one design, an RQI reference signal may be transmitted by a cell in designated resources in subframe $t_3$ and may convey a precoding matrix and a transmit power level that will likely be used on corresponding resources in subframe $t_5=t_3+\Delta$, where $\Delta$ may be a fixed offset. The transmit power level in the corresponding resources may be the same as or different from the transmit power level conveyed in the RQI reference signal, e.g., depending on QoS, channel quality conditions, etc. In one design, all cells may transmit their RQI reference signals on the same resources and may use different cell-specific scrambling. This may allow a UE to measure the desired signal component from a serving cell and the interference from interfering cells based on different scrambling codes for these cells. The RQI reference signals may enable accurate measurement of resource-specific channel conditions with relatively small overhead. The amount of overhead may be dependent on the desired resource granularity.

In one design, RQI from a UE to a serving cell may convey the channel quality of the time frequency resources explicitly or implicitly indicated in an RQI request. The RQI may comprise a quantized channel quality (e.g., of four or more bits) for each of at least one layer to use for data transmission to the UE. Each layer may correspond to a spatial channel in a MIMO channel from the serving cell to the UE. The RQI may also comprise a quantized channel quality for a base layer and a differential value for each additional layer. The RQI may also comprise a rank indicator (RI) (e.g., of one or two bits) to convey the number of layers to use for data transmission.

The messages and transmissions for spatial interference mitigation on the uplink may include (i) information similar to the information described above for spatial interference mitigation on the downlink and/or (ii) other information.

In one design, a UE may send SFI and/or RQI on a control segment that may be cleared of other transmissions. For example, cell X may reserve a control segment for UEs in cell Y and possibly other cells to send SFIs and/or RQIs to cell X. A UE may send SFI or RQI to a cell using OFDMA or NxSC-FDMA.

In one design, the messages and transmissions for spatial interference mitigation may be sub-sampled to reduce signaling overhead. For example, the sequence of messages and transmissions shown in FIG. 2 may be sent once every scheduling interval, and scheduling decisions (e.g., the selected precoding matrices and transmit power levels) may be valid for the entire scheduling interval. A scheduling interval may cover M subframes in one interlace or some other suitable duration. Each interlace may include subframes spaced apart by L subframes. Scheduling intervals for different interlaces may be staggered in time in order to avoid long initial latency caused by sub-sampling. In another design, for persistent scheduling, a message may include a persistence bit to indicate its validity for an extended period of time.

The messages and transmissions in FIGS. 2 and 4 may be sent on various channels. For example, in LTE, a cell may send SFI and RQI requests on a Physical Downlink Control Channel (PDCCH) to UEs. In one design, the cell may send an SFI request or an RQI request using an existing downlink control information (DCI) format, e.g., with different scrambling for a cyclic redundancy check (CRC) to distinguish the SFI or RQI request from other types of messages. In another design, the cell may send an SFI request or an RQI request using a new DCI format. The cell may send multiple SFI or RQI requests jointly in the space corresponding to one PDCCH using different CRCs. The cell may also transmit downlink grants on the PDCCH to scheduled UEs. The cell may transmit data on a Physical Downlink Shared Channel (PDSCH) in one or several HARQ transmissions. The cell may also transmit dedicated reference signals on the PDSCH to scheduled UEs.

A UE may send SFI, RQI, and/or ACK information on (i) a Physical Uplink Control Channel (PUCCH) if only control information is being sent or (ii) a Physical Uplink Shared Channel (PUSCH) if both data and control information are being sent. The SFI and RQI may thus be sent in-band if data is also being sent. The PUCCH may carry up to 12 information bits on two resource blocks (RBs) in one subframe. The 12 information bits may be encoded with a (20, 12) block code to obtain 20 code bits, which may be further processed and sent on two RBs. In one design, a larger payload of Q bits (e.g., 13 to 16 bits) for the SFI may be sent on the PUCCH with a higher code rate, e.g., a (20, Q) code rate, where Q may be more than 12. In another design, the larger payload may be sent with a new PUCCH format. The payload may be encoded with a convolutional code or a Reed-Muller code and sent over two half-RBs. Each half-RB may cover six subcarriers in one slot of six or seven symbol periods and may include a reference signal in the center two symbol periods of the slot. In yet another design, the larger payload may be split into multiple parts, and each part may be sent using an existing PUCCH format. The multiple parts may be sent on different sets of subcarriers in the same subframe with NxSC-FDMA or in different subframes to enable use of higher transmit power for each part. The various messages and transmissions in FIGS. 2 and 4 may also be sent on other data and/or control channels.

The spatial interference mitigation techniques described herein may increase dimensionality on the downlink as well as the uplink. The techniques may provide substantial gains in unplanned deployments (e.g., for coverage extension), restricted association scenarios, and other scenarios. The techniques may be especially advantageous in scenarios with few served UEs observing high interference from few neighbor cells (e.g., femto deployments) and in bursty traffic scenarios.

The techniques described herein may also be used for inter-site packet sharing (ISPS) and cooperative silencing (CS). For ISPS, multiple cells (of the same or different eNBs) may send a packet to a single UE. Each cell may send its data transmission to the UE based on precoding information determined by the UE for that cell. For ISPS, each cell other than the serving cell may steer its transmission in a direction toward the UE (instead of away from the UE) based on the precoding information from the UE. For CS, an interfering cell may reduce its transmit power (possibly to zero) to reduce interference to a UE in a neighbor cell. The interfering cell may determine whether to steer away from the UE or simply reduce its transmit power.

Figures 5, 6:
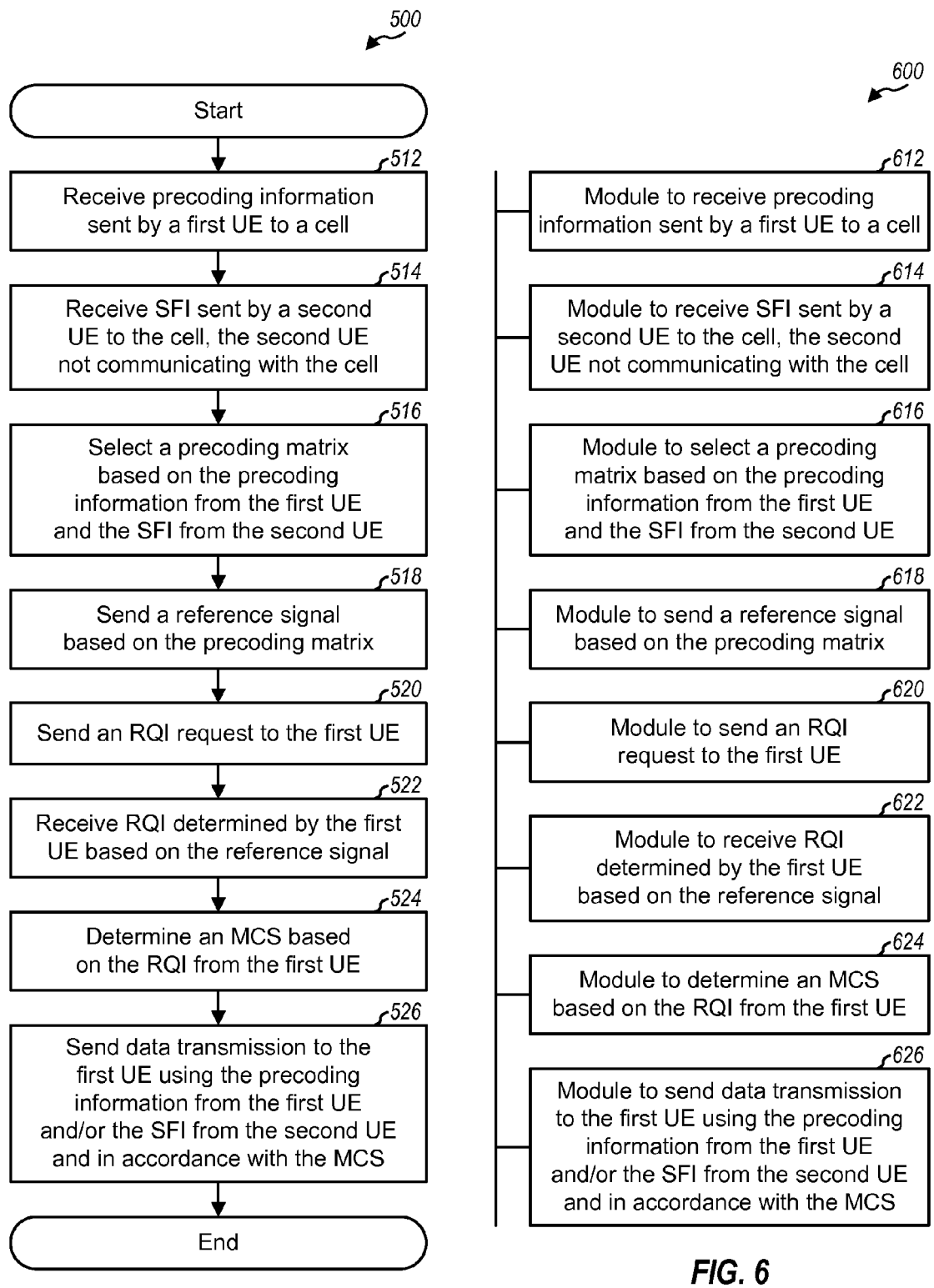
FIGS. 5 and 6 show a process and an apparatus, respectively, for transmitting data on the downlink with spatial interference mitigation.

FIG. 5 shows a design of a process 500 for transmitting data on the downlink with spatial interference mitigation in a wireless communication network. Process 500 may be performed by a cell (as described below) or some other entity. The cell may receive precoding information from a first UE (block 512). The cell may also receive SFI from a second UE not communicating with the cell (block 514). The second UE may send the SFI to the cell in response to (i) an SFI request sent by a serving cell of the second UE or (ii) an SFI request sent by the cell to the second UE. The cell may also send an SFI request to the first UE to ask the first UE to send SFI to at least one interfering cell. The SFI request and the SFI may comprise any of the information described above. The cell may send a data transmission using the precoding information from the first UE and/or the SFI from the second UE.

In one design, the cell may determine whether to schedule the first UE based on the precoding information from the first UE, the SFI from the second UE, and/or other information. If a decision is made to schedule the first UE, then the cell may select a precoding matrix based on the precoding information from the first UE and the SFI from the second UE (block 516). The cell may also determine a transmit power level based on the SFI from the second UE. The cell may send a reference signal based on the precoding matrix and at the determined transmit power level (block 518). The cell may send an RQI request to the first UE (block 520) and may receive RQI determined by the first UE based on the reference signal (block 522). The RQI request and the RQI may comprise any of the information described above. The cell may determine an MCS based on the RQI from the first UE (block 524) and may send a data transmission to the first UE with the precoding matrix and in accordance with the MCS (block 526).

The cell may decide to schedule a third UE that was not requested to send precoding information to the cell in block 512. The cell may send a reference signal based on the SFI from the second UE and possibly precoding information received previously from the third UE. The cell may also send an RQI request to the third UE and may receive RQI determined by the third UE based on the reference signal. The cell may determine an MCS based on the RQI from the third UE and may send a data transmission in accordance with the MCS to the third UE. The cell may also send RQI requests to multiple UEs, receive RQI from each UE, and schedule at least one of the multiple UEs for data transmission.

The cell may also receive SFI from a fourth UE. The second and fourth UEs may communicate with different neighbor cells. The cell may send the data transmission to the first UE using the precoding information from the first UE, the SFI from the second UE, the SFI from the fourth UE, etc.

FIG. 6 shows a design of an apparatus 600 for transmitting data on the downlink with spatial interference mitigation. Apparatus 600 includes a module 612 to receive precoding information sent by a first UE to a cell, a module 614 to receive SFI from a second UE not communicating with the cell, a module 616 to select a precoding matrix based on the precoding information from the first UE and the SFI from the second UE, a module 618 to send a reference signal based on the precoding matrix, a module 620 to send an RQI request to the first UE, a module 622 to receive RQI determined by the first UE based on the reference signal, a module 624 to determine an MCS based on the RQI from the first UE, and a module 626 to send a data transmission to the first UE using the precoding information from the first UE and/or the SFI from the second UE (e.g., the precoding matrix) and in accordance with the MCS.

Figure 7:
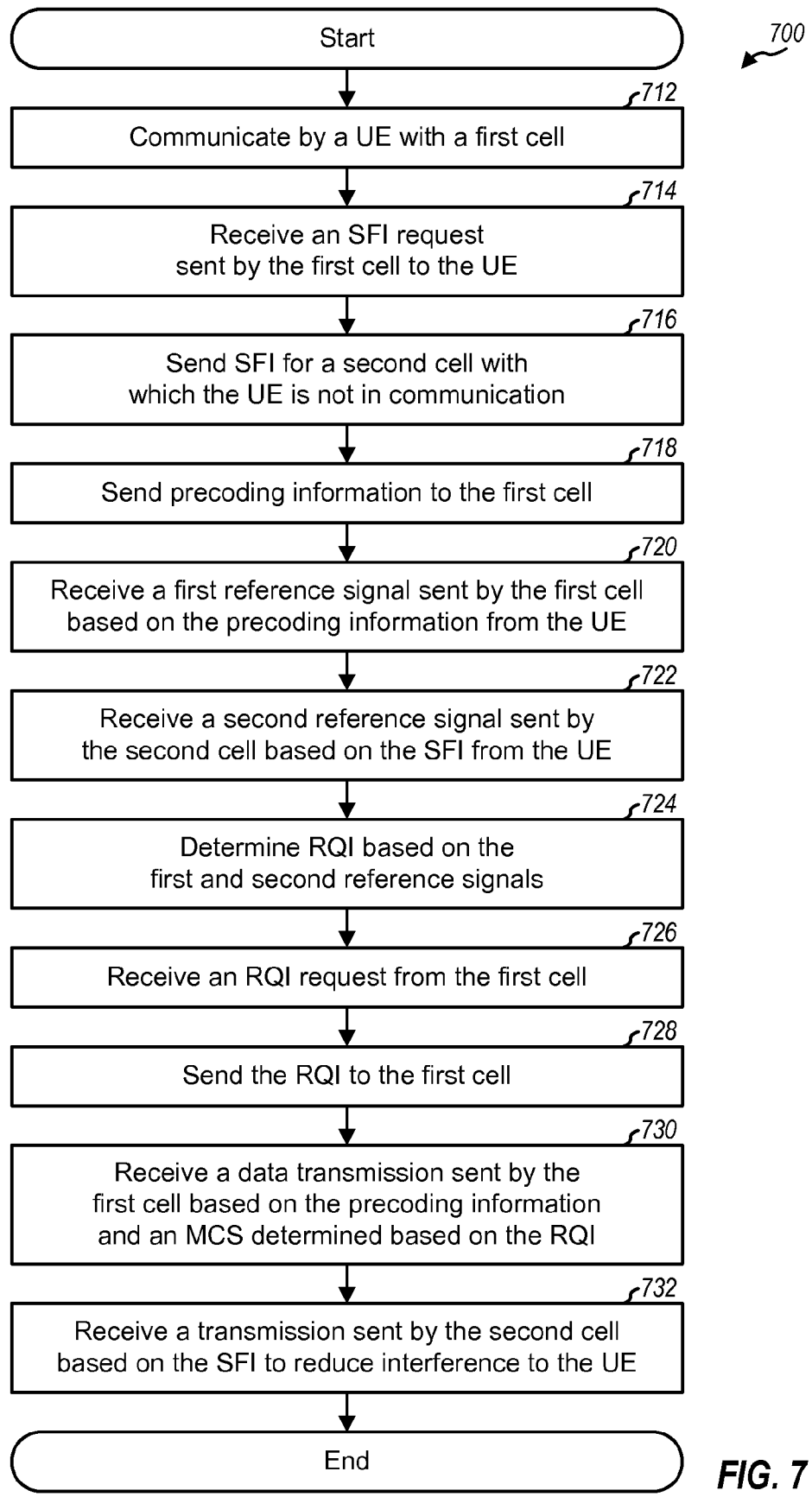
FIGS. 7 and 8 show a process and an apparatus, respectively, for receiving data on the downlink with spatial interference mitigation.

FIG. 7 shows a design of a process 700 for receiving data on the downlink with spatial interference mitigation in a wireless communication network. Process 700 may be performed by a UE (as described below) or some other entity. The UE may communicate with a first cell (block 712) and may receive an SFI request from the first cell (block 714). In response to the SFI request, the UE may send SFI for a second cell with which the UE is not in communication (block 716). The UE may send the SFI either directly to the second cell or to the first cell, which may forward the SFI to the second cell via the backhaul. The SFI request and the SFI may comprise any of the information described above. The UE may also send precoding information to the first cell (block 718). The UE may receive a data transmission sent by the first cell to the UE based on the precoding information.

In one design, the UE may receive a first reference signal sent by the first cell, e.g., with a first precoding matrix determined based on the precoding information from the UE (block 720). The UE may also receive a second reference signal sent by the second cell, e.g., with a second precoding matrix determined based on the SFI from the UE (block 722). The UE may determine RQI based on the first and second reference signals (block 724). The UE may receive an RQI request from the first cell (block 726) and may send the RQI to the first cell in response to the RQI request (block 728). The UE may thereafter receive a data transmission sent by the first cell based on the precoding information (e.g., the first precoding matrix) and in accordance with an MCS determined based on the RQI (block 730). The UE may also receive a transmission sent by the second cell based on the SFI (e.g., the second precoding matrix) to reduce interference to the UE (block 732).

Figure 8:
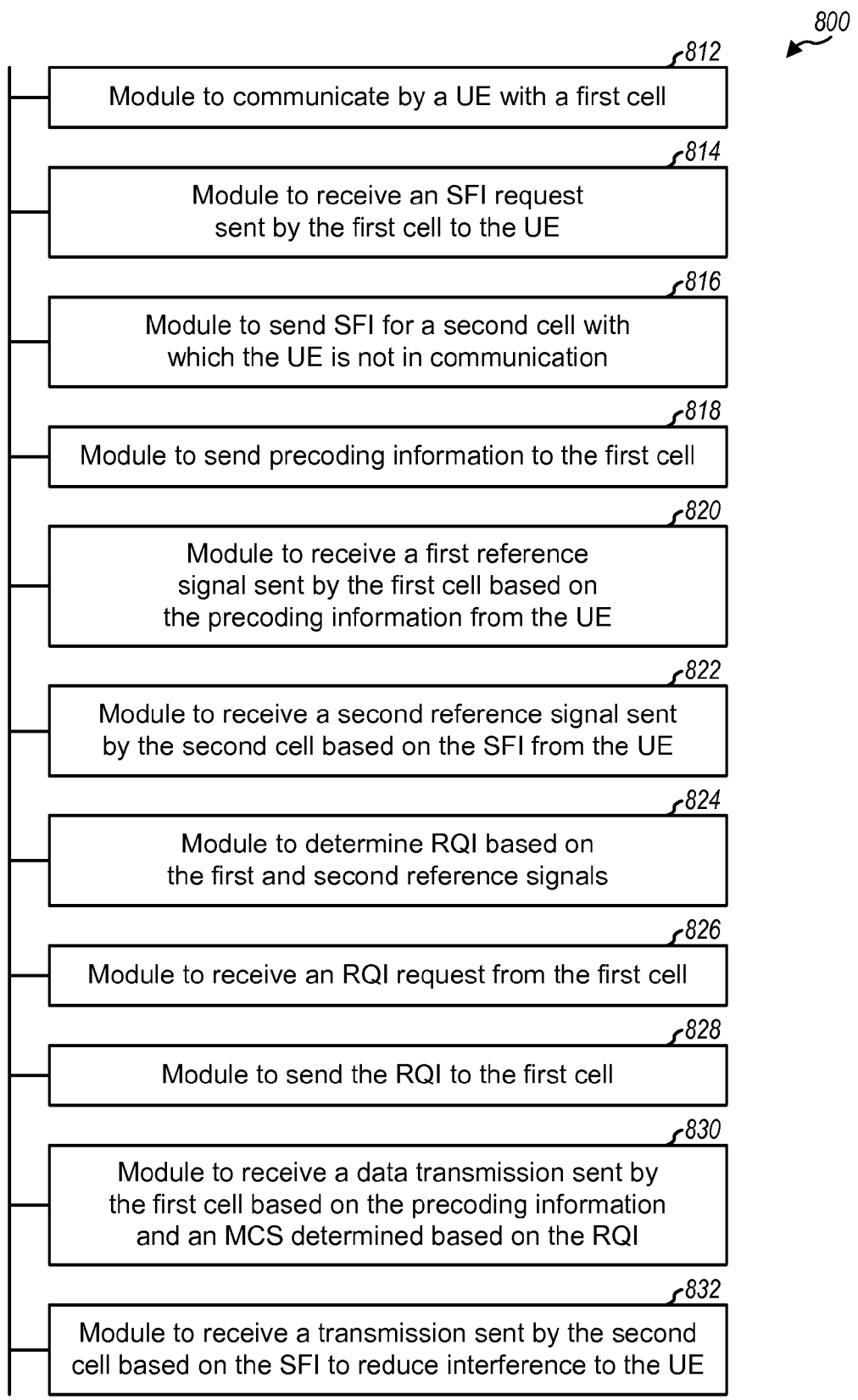

FIG. 8 shows a design of an apparatus 800 for receiving data on the downlink with spatial interference mitigation. Apparatus 800 includes a module 812 to communicate by a UE with a first cell, a module 814 to receive an SFI request sent by the first cell to the UE, a module 816 to send SFI for a second cell with which the UE is not in communication, a module 818 to send precoding information to the first cell, a module 820 to receive a first reference signal sent by the first cell based on the precoding information from the UE, a module 822 to receive a second reference signal sent by the second cell based on the SFI from the UE, a module 824 to determine RQI based on the first and second reference signals, a module 826 to receive an RQI request from the first cell, a module 828 to send the RQI to the first cell, a module 830 to receive a data transmission sent by the first cell based on the precoding information and in accordance with an MCS determined based on the RQI, and a module 832 to receive a transmission sent by the second cell based on the SFI to reduce interference to the UE.

FIG. 9 shows a design of a process 900 for transmitting data on the uplink with spatial interference mitigation in a wireless communication network. Process 900 may be performed by a UE (as described below) or some other entity. The UE may send a resource request to a first cell with which the UE is in communication (block 912). The UE may send an SFI request to a second cell with which the UE is not in communication (block 914). Alternatively, the first cell may send the SFI request to the second cell. In any case, the UE may receive SFI sent by the second cell to the UE in response to the SFI request (block 916). The UE may send a reference signal, e.g., in response to receiving a reference signal request from the first cell (block 918). The UE may receive a grant comprising an MCS determined by the first cell based on the reference signal (block 920). The UE may then send a data transmission to the first cell based on the MCS and the SFI to reduce interference to the second cell (block 922).

In one design, the UE may be equipped with multiple transmit antennas. The UE may receive precoding information from the first cell. The UE may select a precoding matrix based on the precoding information from the first cell and spatial nulling information from the second cell. The UE may then send the data transmission with the precoding matrix. In another design, the UE may be equipped with a single antenna. The UE may obtain a receive nulling gain from the SFI from the second cell. The UE may determine a transmit power level based on the receive nulling gain and may send the data transmission at the transmit power level to the first cell.

FIG. 10 shows a design of an apparatus 1000 for transmitting data on the uplink with spatial interference mitigation. Apparatus 1000 includes a module 1012 to send a resource request from a UE to a first cell with which the UE is in communication, a module 1014 to send an SFI request to a second cell with which the UE is not in communication, a module 1016 to receive SFI from the second cell, a module 1018 to send a reference signal, a module 1020 to receive a grant comprising an MCS determined by the first cell based on the reference signal, and a module 1022 to send a data transmission to the first cell based on the MCS and the SFI to reduce interference to the second cell.

Figure 11:
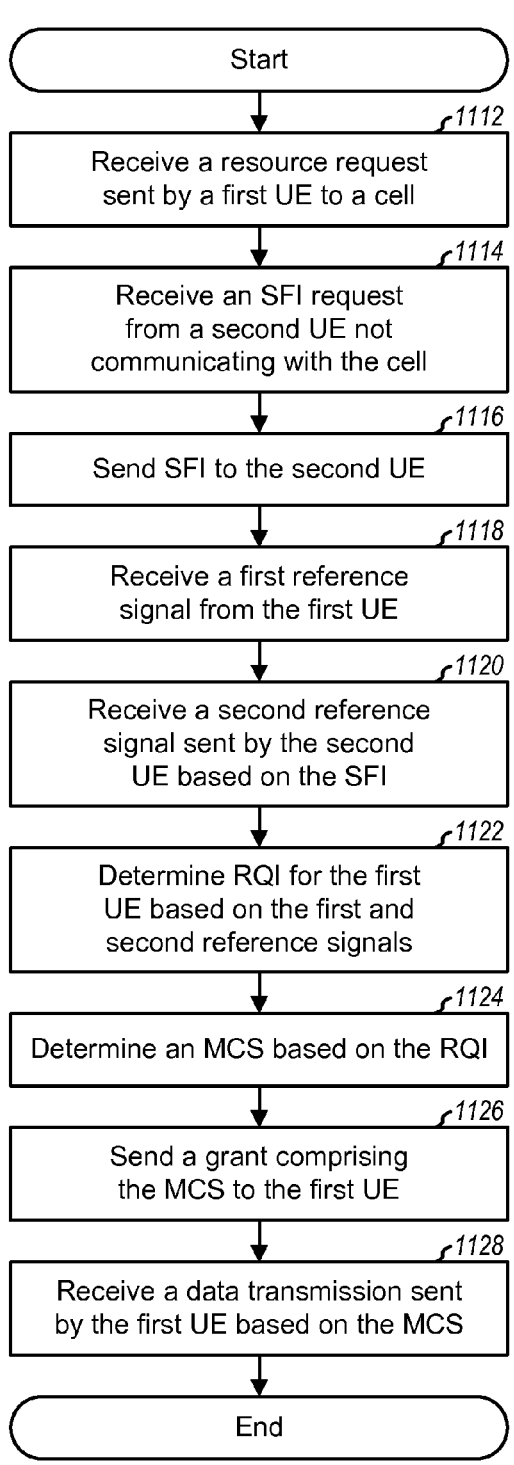
FIGS. 11 and 12 show a process and an apparatus, respectively, for receiving data on the uplink with spatial interference mitigation.

FIG. 11 shows a design of a process 1100 for receiving data on the uplink with spatial interference mitigation in a wireless communication network. Process 1100 may be performed by a cell (as described below) or some other entity. The cell may receive a resource request from a first UE communicating with the cell (block 1112). The cell may receive an SFI request, e.g., from a second UE not communicating with the cell or from the serving cell of the second UE (block 1114) and may send SFI to the second UE in response to the SFI request (block 1116). The cell may receive a first reference signal from the first UE, which may send this reference signal in response to a reference signal request from the cell (block 1118). The cell may also receive a second reference signal sent by the second UE based on the SFI (block 1120). The cell may determine RQI for the first UE based on the first and second reference signals (block 1122). The cell may determine an MCS based on the RQI (block 1124) and may send a grant comprising the MCS to the first UE (block 1126). The cell may receive a data transmission sent by the first UE based on the MCS (block 1128). The data transmission may observe less interference from a transmission sent by the second UE based on the SFI.

Figure 12:
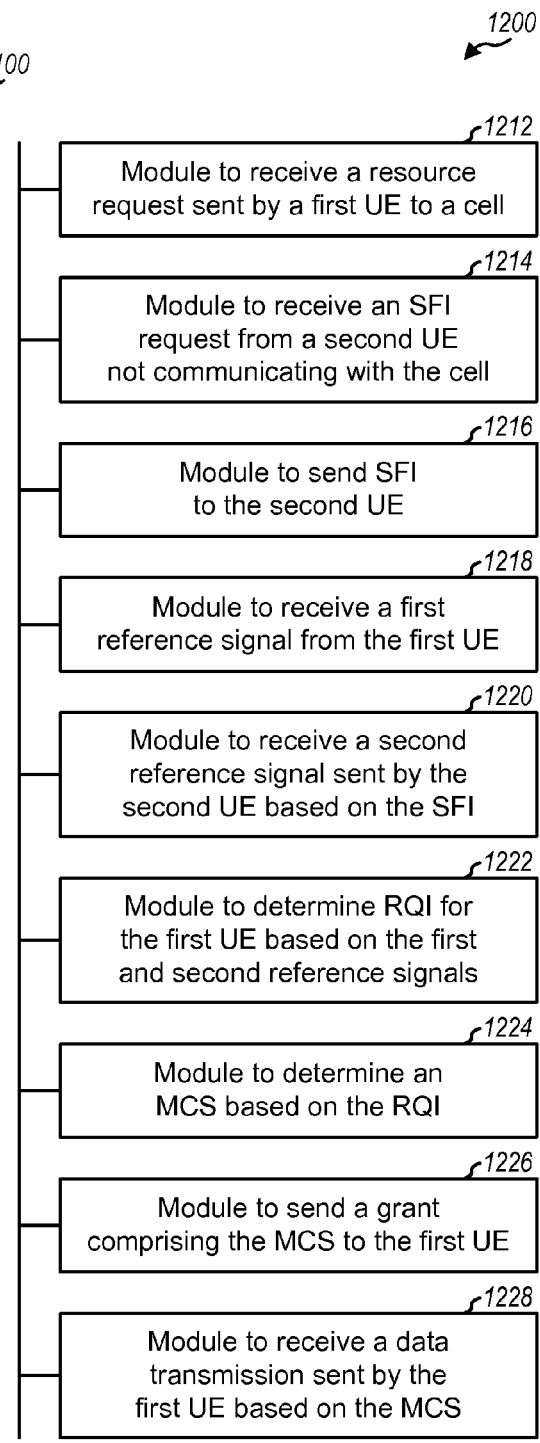

FIG. 12 shows a design of an apparatus 1200 for receiving data on the uplink with spatial interference mitigation. Apparatus 1200 includes a module 1212 to receive a resource request sent by a first UE to a cell with which the first UE is in communication, a module 1214 to receive an SFI request, e.g., from a second UE not communicating with the cell, a module 1216 to send SFI to the second UE, a module 1218 to receive a first reference signal from the first UE, a module 1220 to receive a second reference signal sent by the second UE based on the SFI, a module 1222 to determine RQI for the first UE based on the first and second reference signals, a module 1224 to determine an MCS based on the RQI, a module 1226 to send a grant comprising the MCS to the first UE, and a module 1228 to receive a data transmission sent by the first UE based on the MCS.

The modules in FIGS. 6, 8, 10 and 12 may comprise processors, electronics devices, hardware devices, electronics components, logical circuits, memories, software codes, firmware codes, etc., or any combination thereof.

Figure 13:
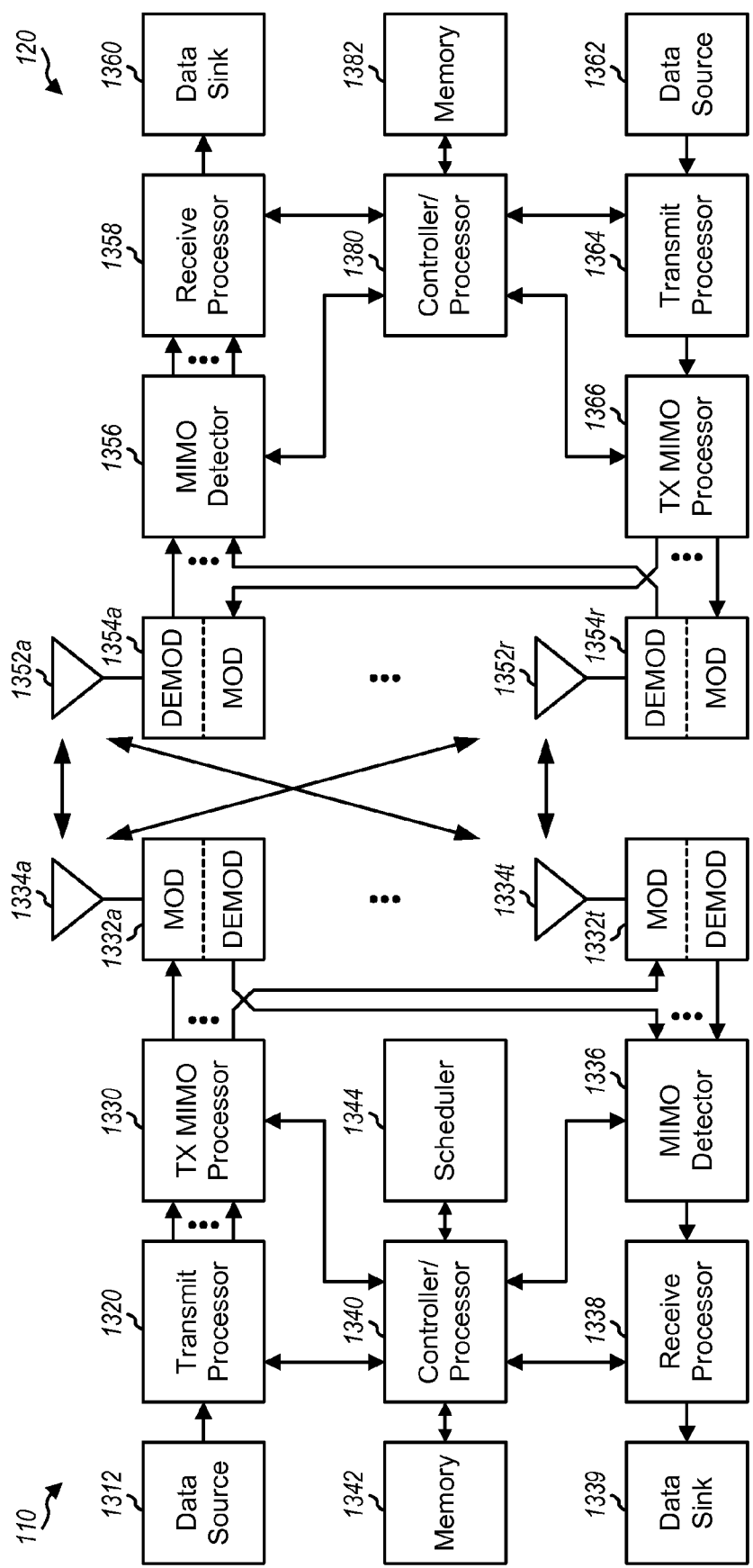
FIG. 13 shows a block diagram of a base station and a UE.

FIG. 13 shows a block diagram of a design of a base station/eNB 110 and a UE 120, which may be one of the base stations/eNBs and one of the UEs in FIG. 1. Base station 110 may be equipped with T antennas 1334a through 1334t, and UE 120 may be equipped with R antennas 1352a through 1352r, where in general $T \geq 1$ and $R \geq 1$.

At base station 110, a transmit processor 1320 may receive data from a data source 1312 and messages from a controller/processor 1340. For example, controller/processor 1340 may provide messages for spatial interference mitigation shown in FIGS. 2 and 4. Transmit processor 1320 may process (e.g., encode, interleave, and symbol map) the data and messages and provide data symbols and control symbols, respectively. Transmit processor 1320 may also generate reference symbols for an RQI reference signal and/or other reference signals or pilots. A transmit (TX) multiple-input multiple-output (MIMO) processor 1330 may perform spatial processing (e.g., precoding) on the data symbols, the control symbols, and/or the reference symbols, if applicable, and may provide T output symbol streams to T modulators (MODs) 1332a through 1332t. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a downlink signal. T downlink signals from modulators 1332a through 1332t may be transmitted via T antennas 1334a through 1334t, respectively.

At UE 120, antennas 1352a through 1352r may receive the downlink signals from base station 110 and may provide received signals to demodulators (DEMODs) 1354a through 1354r, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all R demodulators 1354a through 1354r, perform MIMO detection on the received symbols if applicable, and provide detected symbols. A receive processor 1358 may process (e.g., demodulate, deinterleave, and decode) the detected symbols, provide decoded data for UE 120 to a data sink 1360, and provide decoded messages to a controller/processor 1380.

On the uplink, at UE 120, a transmit processor 1364 may receive and process data from a data source 1362 and messages (e.g., for spatial interference mitigation) from controller/processor 1380. Transmit processor 1364 may also generate reference symbols for an RQI reference signal and/or other reference signals or pilots. The symbols from transmit processor 1364 may be precoded by a TX MIMO processor 1366 if applicable, further processed by modulators 1354a through 1354r, and transmitted to base station 110. At base station 110, the uplink signals from UE 120 may be received by antennas 1334, processed by demodulators 1332, detected by a MIMO detector 1336 if applicable, and further processed by a receive processor 1338 to obtain the decoded data and messages transmitted by UE 120.

Controllers/processors 1340 and 1380 may direct the operation at base station 110 and UE 120, respectively. Processor 1340 and/or other processors and modules at base station 110 may perform or direct process 500 in FIG. 5, process 1100 in FIG. 11, and/or other processes for the techniques described herein. Processor 1380 and/or other processors and modules at UE 120 may perform or direct process 700 in FIG. 7, process 900 in FIG. 9, and/or other processes for the techniques described herein. Memories 1342 and 1382 may store data and program codes for base station 110 and UE 120, respectively. A scheduler 1344 may schedule UEs for data transmission on the downlink and/or uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting data in a wireless communication network, comprising:

receiving precoding information sent by a first user equipment to a cell serving the first user equipment;

receiving spatial feedback information sent by a second user equipment to the cell, the second user equipment not being served by the cell; and sending a data transmission by the cell using at least one of the precoding information from the first user equipment or the spatial feedback information from the second user equipment.

2. The method of claim 1, wherein the spatial feedback information is sent by the second user equipment to the cell in response to a spatial feedback information request sent by a second cell to the second user equipment.

3. The method of claim 1, further comprising:
sending a spatial feedback information request to the first user equipment to ask the first user equipment to send spatial feedback information to a second cell.

4. The method of claim 1, wherein the spatial feedback information from the second user equipment comprises at least one of spatial nulling information for the cell, precoding information for a serving cell of the second user equipment, nulling gain information, resources on which to reduce interference by the cell, a target interference level for the second user equipment, or priority of interference reduction by the cell.

5. The method of claim 1, further comprising:
receiving spatial feedback information sent by a third user equipment to the cell, wherein the second and third user equipments are served by cells other than the cell, and
wherein the data transmission is sent by the cell using at least one of the precoding information from the first user equipment, the spatial feedback information from the second user equipment, or the spatial feedback information from the third user equipment.

6. The method of claim 1, further comprising:
determining whether to schedule the first user equipment based on the precoding information from the first user equipment and the spatial feedback information from the second user equipment.

7. The method of claim 1, further comprising:
selecting a precoding matrix based on the precoding information from the first user equipment and the spatial feedback information from the second user equipment; and
sending a reference signal based on the precoding matrix.

8. The method of claim 7, further comprising:
determining a transmit power level for the reference signal based on the spatial feedback information from the second user equipment, and wherein the reference signal is sent at the determined transmit power level.

9. The method of claim 7, further comprising:
sending a resource quality information request to the first user equipment; and
receiving resource quality information determined by the first user equipment based on the reference signal.

10. The method of claim 9, wherein the resource quality information request comprises at least one of resources on which to determine the resource quality information, resources to use to send the resource quality information, or priority of the resource quality information request.

11. The method of claim 9, wherein the sending the data transmission comprises
determining a modulation and coding scheme based on the resource quality information from the first user equipment, and
sending the data transmission in accordance with the modulation and coding scheme to the first user equipment.

12. The method of claim 1, further comprising:
sending a reference signal based on the spatial feedback information from the second user equipment;
sending a resource quality information request to a third user equipment; and
receiving resource quality information determined by the third user equipment based on the reference signal.

13. The method of claim 12, wherein the sending the reference signal comprises sending the reference signal based further on precoding information from the third user equipment.

14. The method of claim 12, wherein the sending the data transmission comprises
determining a modulation and coding scheme based on the resource quality information from the third user equipment, and
sending the data transmission in accordance with the modulation and coding scheme to the third user equipment.

15. The method of claim 1, further comprising:
sending resource quality information requests to multiple user equipments;
receiving resource quality information from each of the multiple user equipments; and
scheduling at least one of the multiple user equipments for data transmission.

16. An apparatus for wireless communication, comprising:
means for receiving precoding information sent by a first user equipment to a cell serving the first user equipment;
means for receiving spatial feedback information sent by a second user equipment to the cell, the second user equipment not being served by the cell; and
means for sending a data transmission by the cell using at least one of the precoding information from the first user equipment or the spatial feedback information from the second user equipment.

17. The apparatus of claim 16, further comprising:
means for sending a spatial feedback information request to the first user equipment to ask the first user equipment to send spatial feedback information to a second cell.

18. The apparatus of claim 16, further comprising:
means for selecting a precoding matrix based on the precoding information from the first user equipment and the spatial feedback information from the second user equipment; and
means for sending a reference signal based on the precoding matrix.

19. The apparatus of claim 18, further comprising:
means for sending a resource quality information request to the first user equipment; and
means for receiving resource quality information determined by the first user equipment based on the reference signal.

20. The apparatus of claim 16, further comprising:
means for sending a reference signal based on the spatial feedback information from the second user equipment;
means for sending a resource quality information request to a third user equipment; and
means for receiving resource quality information determined by the third user equipment based on the reference signal.

21. An apparatus for wireless communication, comprising:
at least one processor configured to receive precoding information sent by a first user equipment to a cell serving the first user equipment, to receive spatial feedback information sent by a second user equipment to the cell, the second user equipment not being served by the cell, and to send a data transmission by the cell using at least one of the precoding information from the first user equipment or the spatial feedback information from the second user equipment.

22. The apparatus of claim 21, wherein the at least one processor is configured to send a spatial feedback information request to the first user equipment to ask the first user equipment to send spatial feedback information to a second cell.

23. The apparatus of claim 21, wherein the at least one processor is configured to select a precoding matrix based on the precoding information from the first user equipment and the spatial feedback information from the second user equipment, and to send a reference signal based on the precoding matrix.

24. The apparatus of claim 23, wherein the at least one processor is configured to send a resource quality information request to the first user equipment, and to receive resource quality information determined by the first user equipment based on the reference signal.

25. The apparatus of claim 21, wherein the at least one processor is configured to send a reference signal based on the spatial feedback information from the second user equipment, to send a resource quality information request to a third user equipment, and to receive resource quality information determined by the third user equipment based on the reference signal.

26. A computer program product, comprising:
a non-transitory computer-readable medium comprising:
code for causing at least one computer to receive precoding information sent by a first user equipment to a cell serving the first User equipment,
code for causing the at least one computer to receive spatial feedback information sent by a second user equipment to the cell, the second user equipment not being served by the cell, and
code for causing the at least one computer to send a data transmission by the cell using at least one of the precoding information from the first user equipment or the spatial feedback information from the second user equipment.

27. A method of receiving data in a wireless communication network, comprising:
communicating by a user equipment (UE) with a first cell; and
sending spatial feedback information (SFI) for a second cell by the UE, the UE not communicating with the second cell.

28. The method of claim 27, wherein the communicating by the UE comprises
sending precoding information by the UE to the first cell, and
receiving a data transmission sent by the first cell to the UE based on the precoding information.

29. The method of claim 27, wherein the sending the SFI for the second cell comprises sending the SFI for the second cell by the UE to the second cell.

30. The method of claim 27, wherein the sending the SFI for the second cell comprises sending the SFI for the second cell by the UE to the first cell, the first cell forwarding the SFI to the second cell via backhaul.

31. The method of claim 27, further comprising:
receiving an SFI request sent by the first cell to the UE, and wherein the SFI is sent by the UE to the second cell in response to the SFI request.

32. The method of claim 31, wherein the SFI request comprises at least one of a list of at least one cell to send SFI, resources on which to determine the SFI, resources to use to send the SFI, priority of the SFI request, and a target interference level for the UE.

33. The method of claim 27, wherein the SFI comprises a channel direction indicator (CDI) or a precoding matrix indicator (PMI) for the second cell.

34. The method of claim 28, further comprising:
receiving a first reference signal sent by the first cell with a first precoding matrix determined based on the precoding information from the UE; and
determining resource quality information (RQI) based on the first reference signal.

35. The method of claim 34, further comprising:
receiving a second reference signal sent by the second cell with a second precoding matrix determined based on the SFI from the UE, and wherein the RQI is determined based further on the second reference signal.

36. The method of claim 34, further comprising:
receiving an RQI request from the first cell; and
sending the RQI to the first cell in response to the RQI request.

37. The method of claim 34, wherein the receiving the data transmission comprises receiving the data transmission sent by the first cell with the first precoding matrix and further in accordance with a modulation and coding scheme determined based on the RQI.

38. The method of claim 27, further comprising:
receiving a transmission sent by the second cell based on the SFI to reduce interference to the UE.

39. An apparatus for wireless communication, comprising:
means for communicating by a user equipment (UE) with a first cell; and
means for sending spatial feedback information (SFI) for a second cell by the UE, the UE not communicating with the second cell.

40. The apparatus of claim 39, wherein the means for communicating by the UE comprises
means for sending precoding information by the UE to the first cell, and
means for receiving a data transmission sent by the first cell to the UE based on the precoding information.

41. The apparatus of claim 39, further comprising:
means for receiving an SFI request sent by the first cell to the UE, and wherein the SFI is sent by the UE to the second cell in response to the SFI request.

42. The apparatus of claim 40, further comprising:
means for receiving a first reference signal sent by the first cell with a first precoding matrix determined based on the precoding information from the UE;
means for receiving a second reference signal sent by the second cell with a second precoding matrix determined based on the SFI from the UE; and
means for determining resource quality information (RQI) based on the first and second reference signals.

43. The apparatus of claim 42, further comprising:
means for receiving an RQI request from the first cell; and
means for sending the RQI to the first cell in response to the RQI request.

44. A method of sending data in a wireless communication network, comprising:
sending a resource request from a user equipment to a first cell serving the user equipment;
receiving spatial feedback information sent by a second cell to the user equipment, the user equipment not being served by the second cell; and sending a data transmission from the user equipment to the first cell based on the spatial feedback information to reduce interference to the second cell.

45. The method of claim 44, further comprising:
sending a spatial feedback information request from the user equipment to the second cell, and wherein the spatial feedback information is sent by the second cell to the user equipment in response to the spatial feedback information request.

46. The method of claim 44, further comprising:
sending a reference signal by the user equipment; and
receiving a grant comprising a modulation and coding scheme determined by the first cell based on the reference signal, and wherein the data transmission is sent by the user equipment based on the modulation and coding scheme.

47. The method of claim 46, further comprising:
receiving a reference signal request from the first cell, and wherein the reference signal is sent by the user equipment in response to the request.

48. The method of claim 44, further comprising:
receiving precoding information from the first cell; and
selecting a precoding matrix based on the precoding information from the first cell and the spatial feedback information from the second cell, and wherein the data transmission is sent by the user equipment with the precoding matrix.

49. The method of claim 44, wherein the sending the data transmission comprises
determining a transmit power level based on a receive nulling gain from the spatial feedback information from the second cell, and
sending the data transmission at the determined transmit power level.

50. An apparatus for wireless communication, comprising:
means for sending a resource request from a user equipment to a first cell serving the user equipment;
means for receiving spatial feedback information sent by a second cell to the user equipment, the user equipment not being served by the second cell; and
means for sending a data transmission from the user equipment to the first cell based on the spatial feedback information to reduce interference to the second cell.

51. The apparatus of claim 50, further comprising:
means for sending a reference signal by the user equipment; and
means for receiving a grant comprising a modulation and coding scheme determined by the first cell based on the reference signal, and wherein the data transmission is sent by the user equipment based on the modulation and coding scheme.

52. The apparatus of claim 50, further comprising:
means for receiving precoding information from the first cell; and
means for selecting a precoding matrix based on the precoding information from the first cell and the spatial feedback information from the second cell, and wherein the data transmission is sent by the user equipment with the precoding matrix.

53. The apparatus of claim 50, wherein the means for sending the data transmission comprises
means for determining a transmit power level based on a receive nulling gain from the spatial feedback information from the second cell, and
means for sending the data transmission at the determined transmit power level.

54. A method of receiving data in a wireless communication network, comprising:
receiving a resource request sent by a first user equipment (UE) to a cell;
sending spatial feedback information (SFI) from the cell to a second UE not communicating with the cell; and
receiving a data transmission sent by the first UE to the cell, the data transmission observing less interference from a transmission sent by the second UE based on the SFI.

55. The method of claim 54, further comprising:
receiving an SFI request sent by the second UE or a serving cell of the second UE to the cell, and wherein the SFI is sent by the cell to the second UE in response to the SFI request.

56. The method of claim 54, further comprising:
receiving a first reference signal sent by the first UE;
receiving a second reference signal sent by the second UE based on the SFI; and
determining resource quality information (RQI) for the first UE based on the first and second reference signals.

57. The method of claim 56, further comprising:
sending a reference signal request to the first UE, and wherein the first reference signal is sent by the first UE in response to the request.

58. The method of claim 56, further comprising:
determining a modulation and coding scheme (MCS) based on the RQI; and
sending a grant comprising the MCS to the first UE, and wherein the data transmission is sent by the first UE based on the MCS.

59. An apparatus for wireless communication, comprising:
means for receiving a resource request sent by a first user equipment (UE) to a cell;
means for sending spatial feedback information (SFI) from the cell to a second UE not communicating with the cell; and
means for receiving a data transmission sent by the first UE to the cell, the data transmission observing less interference from a transmission sent by the second UE based on the SFI.

60. The apparatus of claim 59, further comprising:
means for receiving a first reference signal sent by the first UE;
means for receiving a second reference signal sent by the second UE based on the SFI; and
means for determining resource quality information (RQI) for the first UE based on the first and second reference signals.

61. The apparatus of claim 60, further comprising:
means for determining a modulation and coding scheme (MCS) based on the RQI; and
means for sending a grant comprising the MCS to the first UE, and wherein the data transmission is sent by the first UE based on the MCS.

62. An apparatus for wireless communication, comprising:
at least one processor configured to send a resource request from a user equipment to a first cell serving the user equipment, to receive spatial feedback information sent by a second cell to the user equipment, the user equipment not being served by the second cell, and to send a data transmission from the user equipment to the first cell based on the spatial feedback information to reduce interference to the second cell.

63. The apparatus of claim 62, wherein the at least one processor is configured to send a reference signal, to receive a grant comprising a modulation and coding scheme determined by the first cell based on the reference signal, and to send the data transmission based on the modulation and coding scheme.

64. The apparatus of claim 62, wherein the at least one processor is configured to receive precoding information from the first cell, to select a precoding matrix based on the precoding information from the first cell and the spatial feedback information from the second cell, and to send the data transmission with the precoding matrix.

65. The apparatus of claim 62, wherein the at least one processor is configured to determine a transmit power level based on a receive nulling gain from the spatial feedback information from the second cell, and to send the data transmission at the determined transmit power level.

66. A computer program product, comprising:
   a non-transitory computer-readable medium comprising:
      code for causing at least one computer to send a resource request from a user equipment to a first cell serving the user equipment;
      code for causing the at least one computer to receive spatial feedback information sent by a second cell to the user equipment, the user equipment not being served by the second cell; and
      code for causing the at least one computer to send a data transmission from the user equipment to the first cell based on the spatial feedback information to reduce interference to the second cell.

* * * * *